US012698828B2

(12) United States Patent
Mason

(10) Patent No.: US 12,698,828 B2
(45) Date of Patent: Aug. 4, 2026

(54) APPARATUSES AND METHODS FOR IMPROVING AUTOMOTIVE TRANSMISSION CONVERTER REAR SIDE PRESSURE

(71) Applicant: SUPERIOR TRANSMISSION PARTS, INC., Tallahassee, FL (US)

(72) Inventor: Dean Mason, Tallahassee, FL (US)

(73) Assignee: SUPERIOR TRANSMISSION PARTS, INC., Tallahassee, FL (US)

( * ) Notice: Subject to any disclaimer, the term of this patent is extended or adjusted under 35 U.S.C. 154(b) by 0 days.

(21) Appl. No.: 19/298,887

(22) Filed: Aug. 13, 2025

(65) Prior Publication Data

US 2026/0049656 A1     Feb. 19, 2026

Related U.S. Application Data

(60) Provisional application No. 63/682,427, filed on Aug. 13, 2024.

(51) Int. Cl.
| | |
|---|---|
| *F16H 61/14* | (2006.01) |
| *F16H 45/02* | (2006.01) |
| *F16K 31/06* | (2006.01) |
| *F16H 61/00* | (2006.01) |

(52) U.S. Cl.
CPC .......... *F16H 61/143* (2013.01); *F16H 45/02* (2013.01); *F16K 31/06* (2013.01); *F16H 2045/0215* (2013.01); *F16H 2061/0062* (2013.01)

(58) Field of Classification Search
CPC . F16H 61/143; F16H 45/02; F16H 2045/0215
See application file for complete search history.

(56) References Cited

U.S. PATENT DOCUMENTS

| | | | | |
|---|---|---|---|---|
| 6,832,671 B1 * | 12/2004 | Stafford | .............. | F16H 61/0276 |
| | | | | 192/3.3 |
| 7,100,753 B1 * | 9/2006 | Stafford | .............. | F15B 13/0402 |
| | | | | 192/3.3 |
| 9,334,946 B1 * | 5/2016 | Mason | ................ | F16K 11/0708 |
| 2020/0011412 A1 * | 1/2020 | Hardin | ............... | G05D 16/2013 |
| 2020/0025291 A1 * | 1/2020 | Weissenfluh | ........ | F16H 61/0276 |
| 2022/0154735 A1 * | 5/2022 | Stafford | .................... | F15B 1/04 |

* cited by examiner

*Primary Examiner* — Timothy Hannon

(57) ABSTRACT

Three operational defects in the 8L series transmission, individually or in combination, produce a shudder complaint and potentially damage the torque converter. An incorrectly ported torque converter control valve is corrected by increasing length of an undersized third land to prevent mixing of three adjacent flow channels and a loss of lockup apply pressure. Start time of a torque converter enable valve regulation cycle is rescheduled to avoid causing excessive rear side pressure drop and significantly shortening time required to pressure up apply side of a converter clutch. A lockup solenoid is replaced with an anti-ballooning assembly to better control pressure and avoid complete transmission failure.

15 Claims, 23 Drawing Sheets

Convert Clutch Applied: converter CA is filled from the rear side

TCC Apply feed is directed from the enable valve EV through the control valve CV

TransLab VALVE SEQUENCING

TransLab vs OEM enable Valve output COMPARISON

TransLab SEQUENCING & Rear Side Pressure Drop

INCREASING SOLENOID DUTY CYCLE ------------------->

INCREASING SOLENOID OUTPUT PRESSURE

EV   CV

FV

PWM CYCLE
BEGINS HERE

— — —
Lockup
solenoid
signal

- - - - - -
Enable valve
regulated
pressure

Converter
Rear Side
(lockup APPLY)
pressure drop

TransLab SEQUENCING & Rear Side Pressure Drop

APPARATUSES AND METHODS FOR IMPROVING AUTOMOTIVE TRANSMISSION CONVERTER REAR SIDE PRESSURE

FIELD OF THE INVENTION

In general, timing of functions and components is a major consideration in the design of an automatic automotive transmission. And by common practice, component timing is a routine and necessary consideration in the original design of any system of this nature. Whether it be clutch component application to achieve the various gear ratios, or valve sequencing, or electronic devices, functions must be timed in relation to each other. However, unanticipated anomalies arise in practice, which must be addressed as an exception to the normal standard.

This invention is drawn generally to automatic automotive transmissions, more specifically to the Hydramatic 8 speed automatic transmission, which is commonly referred to as the 8L90, or 8L(xx) series, where "xx" is replaced by the appropriate torque range of the specific engine with which it is paired. For example, the "8L50" series transmission is paired with a 3.6 L V6 engine and the "8L90" series transmission is paired in a pickup truck with a 5.3 L V8 engine. Component parts and correction process described in this disclosure are designed specifically for the 8L(xx) series transmission or any other transmission that shares a similar structure.

BACKGROUND OF THE INVENTION

General Motors and the Hydramatic Division initiated a two-year campaign to correct consumer complaints about a converter clutch shudder in the 8L(xx) series that plagued their warranty department. A minor field fix was implemented for these complaints but has proved to be an ineffectual temporary band-aid, at best. The problem returns after a few months to a year. Yet, to date, a more effective repair has not been produced. A fix from the original equipment manufacturer (OEM) appears not to be likely, as the 8-speed series transmission is being superseded by the 10-speed series transmission.

A torque converter "shudder" is a drivability complaint that can be likened to a lean fire miss on multiple cylinders, or driving over speed bumps, highway lane proximity warning markers, or rough road surface. The vibration can be felt in the steering wheel and causes blurred vision in the rear-view mirror. This condition is caused by insufficient converter clutch apply pressure and can be experienced a) during initial apply due to delayed or sluggish lockup apply pressure rise, or b) at cruise in lockup when pulling an incline, due to insufficient clamping force.

To fix the issues present in the engineering of the OEM 8L(xx) series transmission, it is important to understand the original operational theory, as provided in FIGS. 1-9 showing hydraulic schematics of the OEM 8L(xx) series transmission. The converter control valve controls direction of fluid fill into the torque converter. This switching function is clearly illustrated in FIGS. 6-9. FIG. 1 shows the hydraulic system with the torque converter clutch (or lockup) released. When filled from the front side FS, or engine side, of the damper plate and lockup clutch assembly CA, the clutch is held OFF of the lockup clutch surface, inside the front cover, by continual charge at higher pressure than that in the rear side RS, with sufficient volume to maintain a constant flow of automatic transmission fluid (ATF) across the lockup clutch lining as a lubricant and coolant, thereby preventing lockup engagement.

In FIGS. 2 and 3, step 1 begins with flow regulated line pressure directed into the converter feed circuit at the main pressure regulator PR. Then in step 2, converter feed pressure is delivered to the torque converter limit valve, which establishes an upper limit to internal converter pressure. Next, in step 3, converter limit output flows between lands L1 and L2 of the control valve CV into the converter release side feed circuit. Pressure limited converter feed is then delivered to the front side FS (release) of the converter CA, as shown in step 4. In FIG. 3, step 5 shows rear side oil exiting the converter CA, then the rear side oil flows between lands L2 and L3 of the control valve CV and out to the cooler CO. This lockup release pressure is derived from main line pressure routed through the torque converter (TC) limit valve (see FIG. 2; bottom center), which establishes an upper limit to converter supply, then loops around through the converter control valve between lands L1 and L2 and is directed through the torque converter control release circuit to the front side of the converter CA.

When switching to lockup apply mode, output signal of the lockup control solenoid S7 is directed to the right end of the converter control valve CV, near land L4, and on the right end of converter fault valve FV (see FIGS. 4 and 5), switching them to lockup apply position. In step 7, line pressure is supplied to the torque converter enable valve EV, the function of which is to ramp up the pressure from low to high in the torque converter apply circuit at the rate determined by the PWM signal applied to the solenoid S7. This results in step 8, converter CA filling from the rear side RS. Converter clutch apply pressure is directed to the rear side RS of the torque converter CA, while the front (release) side is drained to sump, allowing the clutch to apply against the converter front cover.

FIGS. 6 and 7 illustrate the system with lockup released, or converter clutch released. While the converter CA is charged from the front side FS, as in step 9, the control valve CV is rightward in the bore.

FIGS. 8 and 9 illustrate the system with lockup applied, or converter clutch applied. While the converter CA is charged from the rear side RS, as in step 11, the control valve CV is leftward in the bore, as in step 13.

The operational theory described above is straight forward. However, the issue with fixing the problem lies in how the various states of the transmission are graphically shown. Hydraulic diagrams are an indispensable tool that convey a lot of important information about transmission function. But the nature of the shudder problem is not revealed in them because the diagrams are static snap shots. The circuits in FIGS. 6-9 show two static states: a before state and an after state, or operation in non-lockup mode and operation after lockup is fully applied. What they do not show is what happens in the process between these two states; and that is where the problem and solution are found.

BRIEF SUMMARY OF THE INVENTION

The primary invention involves the process and methodology of addressing and removing the torque converter shudder. This includes changes to operational parameters and functionality, a resequencing of control circuits, and a newly created and additional hydraulic circuit and function. Implementation of the engineering changes requires design alteration to certain components contained in the lockup control system, which are themselves inventions. The employed technology in the primary invention produces these parts. The re-engineering, or remapping of the hydraulic circuitry according to the primary invention, defines the parameters of these parts. The flow corrected converter clutch control valve is a corrected design for an existing OEM valve designed specifically for the 8L(xx) series transmission and is not applicable to any other due to unique circuit mapping and strategy. The enable valve of the present invention increases the pressure, or flow output, for maximum converter fill volume in the shortest time, which is an important consideration in lieu of the delayed and sluggish lockup apply function. The anti-ballooning pressure relief damper assembly is specially created for a unique new function related to the 8L(xx) series hydraulics. It does not replace a component of the same or similar function.

It is therefore an object of the present invention to provide a process for conserving and improving automotive transmission converter rear side pressure during a switching event, comprising sealing a leak along a converter control valve close to a cooler port simultaneously or slightly before opening a TC enable supply at the control valve; rescheduling a TC enable valve regulation start time to begin before a switching time of the converter control valve, wherein the enable valve exhaust port is closed to prevent rear side venting of volume; and shortening a lockup apply cycle through insertion of an enable valve, which provides for greater flow volume delivery at a same pressure as an OEM enable valve, to fill and pressurize the TC rear side for faster lockup apply.

This process may also include installing an Anti-Ballooning pressure relief valve assembly to provide emergency pressure blow-off and prevent run-away internal converter pressure.

The process may also include, wherein during a solenoid signal, a TC enable valve begins a TC enable regulation cycle before either the converter control valve or a converter fault valve switches.

The process of claim 3, wherein the torque converter enable valve begins to regulate at 68947.6 pascal (Pa), the converter fault valve begins to switch at 82,737.1 Pa, and the converter control valve begins to switch at 96,526.6 Pa. The process may also include, wherein the torque converter enable valve begins to switch at 137,895 pascal (Pa), and the converter fault valve and the converter control valve begin to switch after 137,895 Pa.

The process may also include, wherein the torque converter enable valve begins to switch 20684.3 pascal (Pa) or less before the pressure necessary to begin to switch the converter control valve.

The process may also include, wherein, instead of rescheduling the TC enable valve start time, a start time of a converter fault valve and the converter control valve are rescheduled to start after the TC enable valve start time.

The process may also include, wherein the solenoid signal has a control valve switching time pressure of 110,316 to 186,158 pascal (Pa).

Another object of this invention is to teach a torque converter control valve, comprising a first land being cylindrically shaped; a second land being cylindrically shaped; a third land being cylindrically shaped; a fourth land being cylindrically shaped; a first cylindrical member coaxially positioned between the first land and the second land to form a first groove; a second cylindrical member coaxially positioned between the second land and the third land to form a second groove; and a third cylindrical member coaxially positioned between the third land and the fourth land to form a third groove, wherein a bevel circumferentially extends around an end of the first land adjacent to the first cylindrical member, and wherein a length of the third land is greater than 4.8768 mm (0.192 in) to close a cooler port simultaneously or slightly before opening a torque converter enable supply port at a control valve.

The converter control valve may include, wherein the third land comprises two or more smaller lands, each small land of the two or more smaller lands separated from another smaller land of the two or more smaller lands by a cylindrical member forming a groove therebetween.

The converter control valve may include, wherein the length of the third land is equal to or greater than 5.207 mm (0.205 in).

The converter control valve may include, wherein the length of the third land is about 6.1468 mm (0.242 in).

Another object of this invention is to teach a torque converter enable valve, comprising a first land being cylindrically shaped; a second land being cylindrically shaped; a third land being cylindrically shaped; a first cylindrical member coaxially positioned between the first land and the second land to form a first groove; a second cylindrical member coaxially positioned between the second land and the third land to form a second groove; a third cylindrical member extending from an end of the third land opposite to the second cylindrical member, a free end of the third cylindrical member having a bevel circumferentially extending therearound; a chamber extending from an opening along the free end of the third cylindrical member and along a longitudinal length inside the torque converter enable valve, with a hole positioned along the second cylindrical member fluidly connecting the chamber to external environment, wherein a second bevel is formed circumferentially along an end of the third land adjacent to the second cylindrical member.

The torque converter enable valve may also include, wherein the first land, the second land, and the third land are grooved.

Another object of the present invention is to teach a method of improving transmission function, comprising replacing an OEM torque converter enable valve with the torque converter enable valve of the present invention, which increases a volume of continual non-oscillating pressure output without use of a counter-balance spring, and inherently dampens as a counter-measure to an effect of applied oscillating signal.

Another object of the present invention is to teach an anti-ballooning damper assembly, comprising a sleeve having a cylindrical body with a chamber extending through an interior of the cylindrical body, ends of the chamber defined by two opposing openings, each located at an opposing longitudinal end of the cylindrical body, the chamber having a choke area that has a smaller diameter than a remainder of the chamber on either side of the choke area; a ball; a conical spring with a first end and a second end, the first end having a smaller diameter than the second end; and a circular spring seat, wherein the ball is configured to sit within the choke area and the conical spring is configured to be positioned between the ball and circular spring seat when the anti-ballooning damper assembly is assembled.

BRIEF DESCRIPTION OF THE SEVERAL VIEWS OF THE DRAWINGS

The invention will be better understood with reference to the following drawings.

DESCRIPTION OF THE INVENTION

The following description of the 8L(xx) series transmission provides the conditions that exist in dynamic real-time process. Three problems being operational defects, individually or in combination, produce the shudder complaint and/or potentially damage the torque converter. These are:

A. An incorrectly ported OEM converter control valve, hereinafter, the control valve CV, that, due to an undersized (length) #3 land, hereinafter, the land L3, allows mixing of three adjacent flow channels, and a loss of lockup apply pressure.

B. In the valve sequencing, the start time of the torque converter enable valve regulation cycle is unnecessarily delayed, causing excessive rear side pressure drop and significantly lengthening the time required to pressure up the apply side of the converter clutch. The result is insufficient clamping force both during the apply cycle and while cruising at highway speeds with lockup applied.

C. The lockup solenoid #7, hereinafter, solenoid S7 has LINE pressure (primary control pressure) as its operational source. This introduces serious potential danger. A solenoid S7 malfunction can balloon the torque converter, resulting in complete failure.

Figure 10:
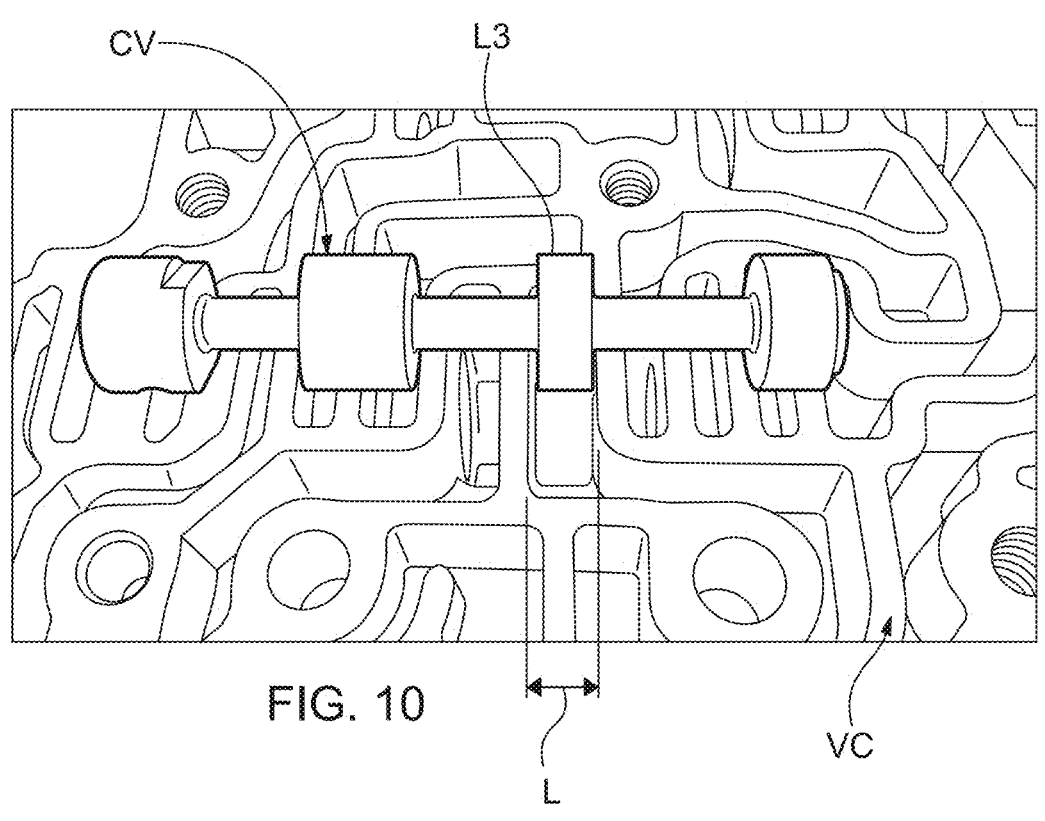
FIG. 10 is an illustration of the OEM torque converter control valve positioned above its corresponding installed location in valve body casting of the 8L(xx) series transmission.
Figure 11:
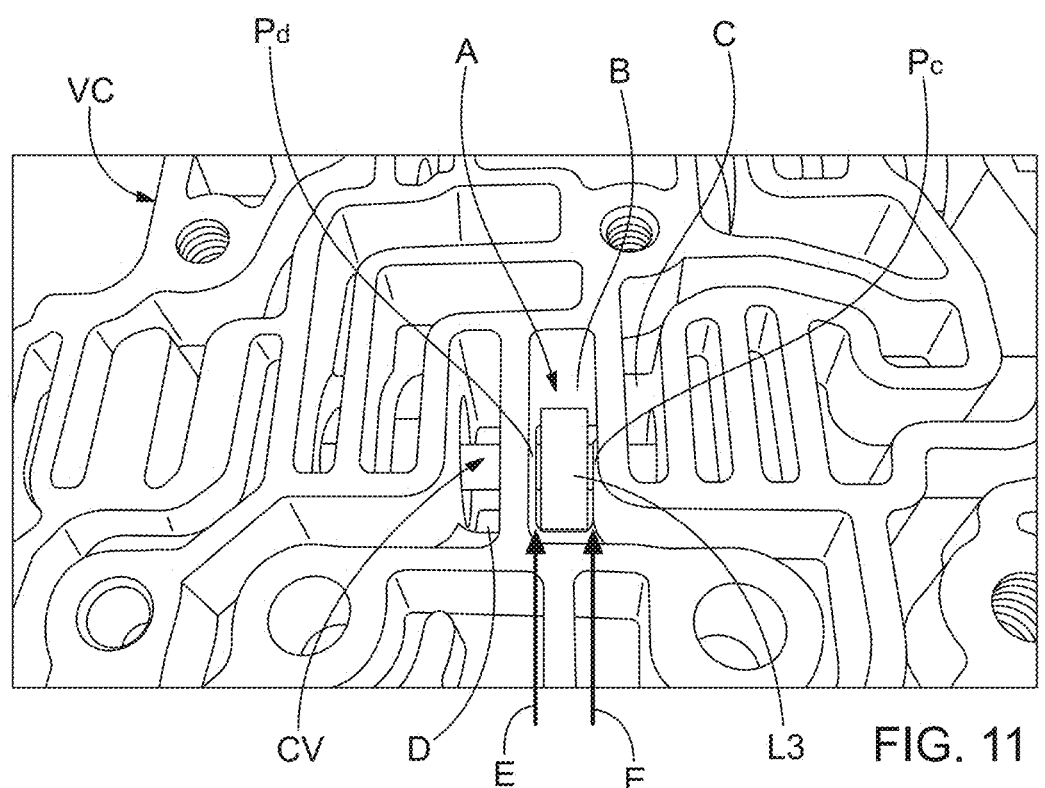
FIG. 11 is an illustration of the OEM torque converter control valve installed in the valve body casting of the 8L(xx) series transmission to illustrate positioning of the OEM torque converter control valve mid-stroke.
Figure 12:
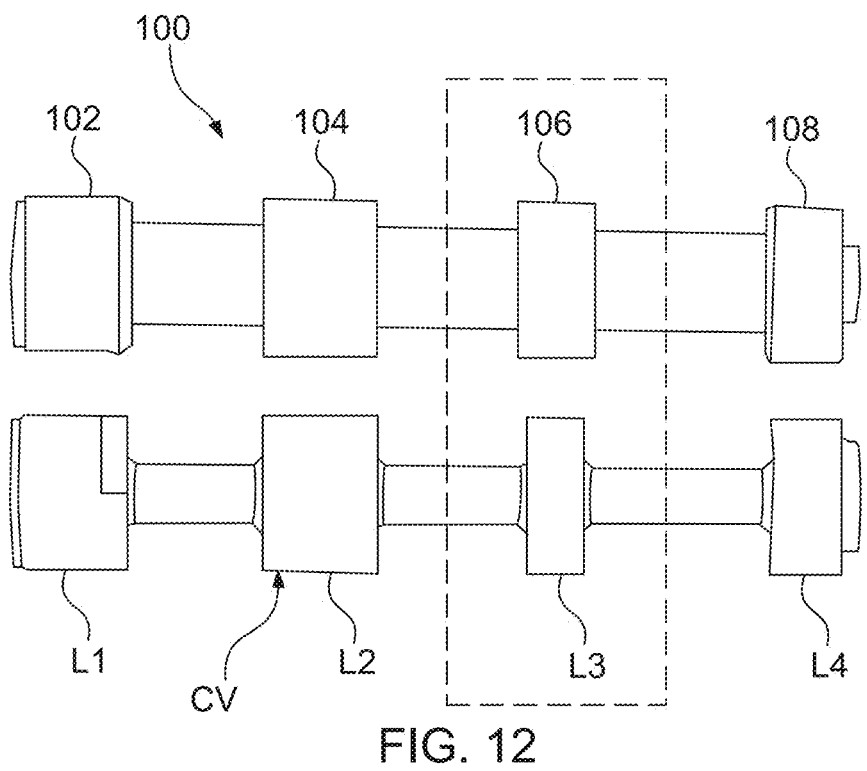
FIG. 12 is a side-by-side comparison of a torque converter control valve according to an embodiment of the present invention and the OEM torque converter control valve to compare the size of a corresponding land identified in the box shown in broken lines.

Problem A relates to the length of land L3 of the valve CV. FIGS. 10 and 11 provide a view of the valve casting and illustrate the issue presented with the valve CV and land L3. A length of the land L3 of the valve CV is shorter than a width of channel or opening A for converter out flow in the valve body casting VC. As shown by the double-sided arrow in FIG. 10, the length L of the opening A is approximately 6.0706-6.096 millimeters (mm), or 0.239-0.240 inches ("). The length of land L3 is only 4.8768 mm (0.192"). Therefore, in a midway position of the land L3 in opening A, as shown in FIG. 11, there is temporary cross-connection of three circuits, namely the torque converter apply circuit B, torque converter enable valve supply C, and cooler circuit D, due to gaps shown by arrows E between land L3 and the walls of the valve casting VC of opening A, through which circuit B runs. FIG. 11 illustrates a mid-stroke position of the control valve CV and the circuits B, C, and D. This mid-stroke position occurs from approximately 96,526.6-117,211 Pascal (Pa), or 14-17 pounds per square inch (PSI). Flow is in the direction of the converter rear side, or circuit B.

In non-lockup mode, fluid flow is in the opposite direction, i.e. rear side out to cooler, or circuit B to D as the converter is filled from the front side. But during the switching process in either direction, whether releasing or applying lockup, all three are connected: cooler (circuit D), apply (circuit B), and enable supply (circuit C). This introduces several complications, all of which are not in the primary interest of this application. The most applicable complication is that during valve stroke when switching to lockup APPLY, as soon as land L3 cracks open to supply lockup apply oil to opening A and the torque converter rear side RS in circuit B via port orifice Pc, the enable valve output circuit C is also cross-connected to the cooler circuit D via port orifice Pd. Since the cooler circuit D is an open system, as soon as supply stops, pressure drops to zero, as it ultimately spills into the sump. This can be seen in FIG. 20. Any available enable valve output pressure is allowed to dissipate through the cooler. Front side oil is also being drained during this switching process, so supply from the converter clutch release circuit B has stopped.

Figure 13:
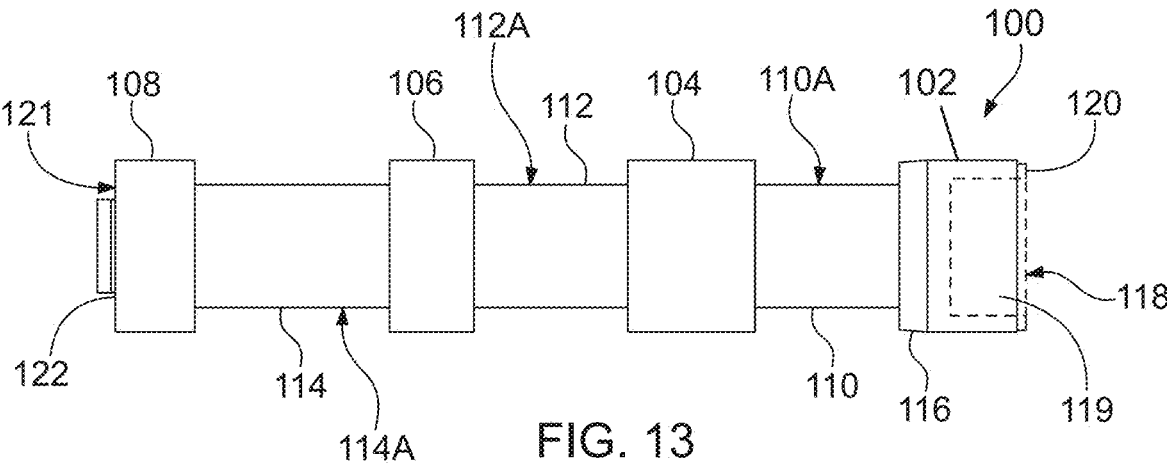
FIG. 13 is a side view of the torque converter control valve according to a preferred embodiment of the present invention.

To address this issue, an improved torque converter control valve 100, shown in FIG. 13, has been designed to replace the OEM torque converter control valve CV. The TC control valve 100 includes a first land 102 being cylindrically shaped, a second land 104 being cylindrically shaped, a third land 106 being cylindrically shaped, and a fourth land 108 being cylindrically shaped. A first cylindrical member 110 is coaxially positioned between the first land 102 and the second land 104. The first cylindrical member 110 has a smaller diameter than either the first land 102 or the second land 104, and thereby forms a first groove 110A. A second cylindrical member 112 is coaxially positioned between the second land 104 and the third land 106. The second cylindrical member 112 has a smaller diameter than either the second land 104 or the third land 106 and thereby forms a second groove 112A. A third cylindrical member 114 is coaxially positioned between the third land 106 and the fourth land 108. The third cylindrical member 114 has a smaller diameter than either the third land 106 or the fourth land 108 and thereby forms a third groove 114A. A bevel 116 circumferentially extends around an end of the first land 102 adjacent to the first cylindrical member 110. A length, or width (both referencing the same measurement in the art), of the third land 106 is greater than 4.8768 mm (0.192"), and is therefore configured to close a TO COOLER circuit D port simultaneously or slightly before opening a TC ENABLE supply circuit C at the control valve 100 in an automotive transmission converter. Preferably, the third land 106 has a length of 6.1468 mm (0.242"). Additionally, the first land 102 has a free end 118 with a bore 119 extending within the first land shown in dashed lines along a partial length of the first land.

A preferred embodiment of the valve 100 has specific dimensions. The valve 100 preferably has an overall length of 65.9892 mm (2.598"). The first land 102 preferably has a length of 9.2456 mm (0.364") and a diameter of 11.938 mm (0.470"). The bore 119 preferably has a length or depth of 5.5372 mm (0.218") and a diameter of 10.033 mm (0.395"). The bevel 116 on the first land 102 preferably has a length of 2.032 mm (0.080"). The first land may additionally have an undercut 120 along end 118 having a length of 0.762 mm (0.030"). The second land 104 preferably has a length of 9.2202 mm (0.363") and a diameter of 11.938 mm (0.470"). A length between free end 118 and the second land 104, inclusive of the second land is preferably 28.5496 mm (1.124"). The third land 106 preferably has a length of 6.1468 mm (0.242") and a diameter of 11.938 mm (0.470"). The fourth land 108 preferably has a length of 5.7912 mm (0.228") and a diameter of 11.938 mm (0.470"). The first groove preferably has a length of 10.0838 mm (0.397") and a diameter of 8.382 mm (0.330"). The second groove preferably has a length of 10.6172 mm (0.418") and a diameter of 8.382 mm (0.330"). The third groove preferably has a length of 13.5636 mm (0.534") and a diameter of 8.382 mm (0.330"). A member 122 may extend from a free end 121 of the valve 100. The member 122 preferably has a length of 1.3208 mm (0.052") and a diameter of 6.35 mm (0.250").

Figure 14:
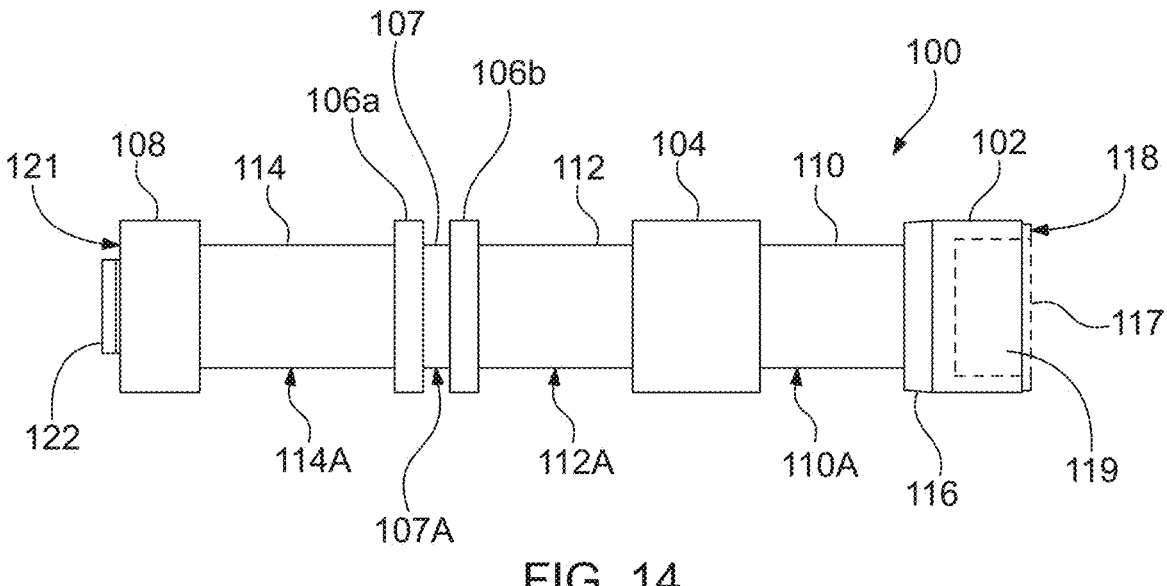
FIG. 14 is a side view of the torque converter control valve according to an alternate embodiment of the present invention.

In alternate embodiments of the TC control valve, as shown in FIG. 14, the third land 106 may comprise two or more smaller lands 106A and 106B, each small land of the two or more smaller lands separated by a cylindrical member 107 forming a groove 107A therebetween. The exact length of the two or more smaller lands 106A and 106B and cylindrical member 107 may vary, but is greater than 4.8768 mm (0.192"). Preferably, the total length of the two or more smaller lands 106A and 106B and cylindrical member 107 is 6.1468 mm (0.242"). The diameter of each land of the two or more smaller lands 106A and 106B is preferably 11.938 mm (0.470"). The diameter of the cylindrical member 107 is preferably 8.382 mm (0.330").

Figure 5:
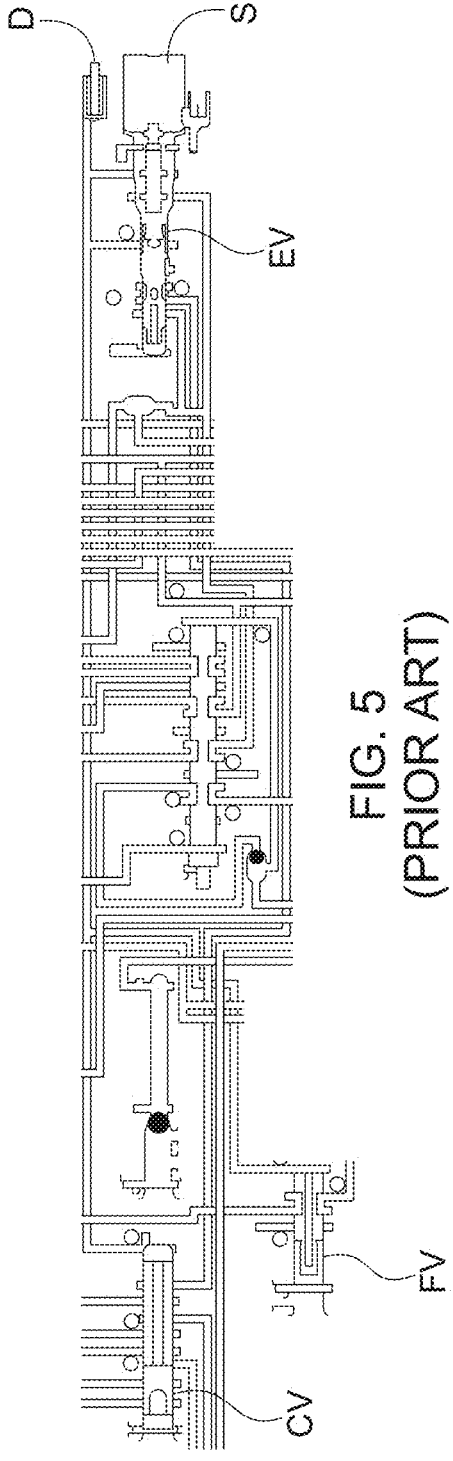
FIG. 5 is a partial view of the hydraulic diagram of FIG. 4 showing a hydraulic solenoid #7 switching strategy involving the OEM converter control valve, OEM converter fault valve, and OEM torque converter clutch enable valve.
Figure 6:
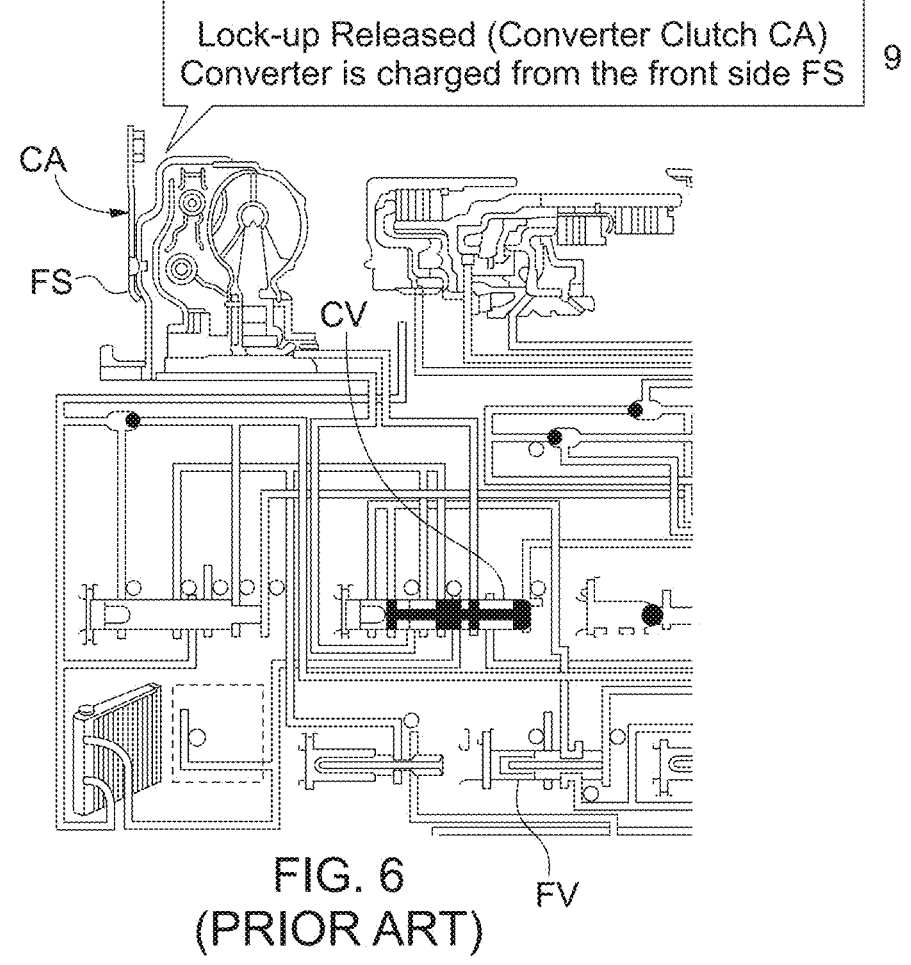
FIG. 6 is a partial view of a hydraulic system diagram of the 8L(xx) series transmission with lock-up (converter clutch) released and torque converter charged from the front side.
Figure 7:
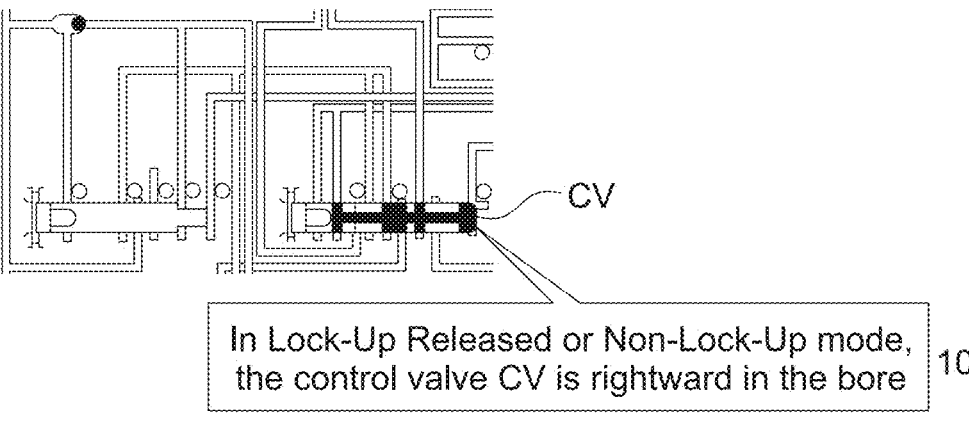
FIG. 7 is a partial view of a hydraulic system diagram of the 8L(xx) series transmission with lock-up (converter clutch) applied and torque converter charged from the rear side.
Figure 8:
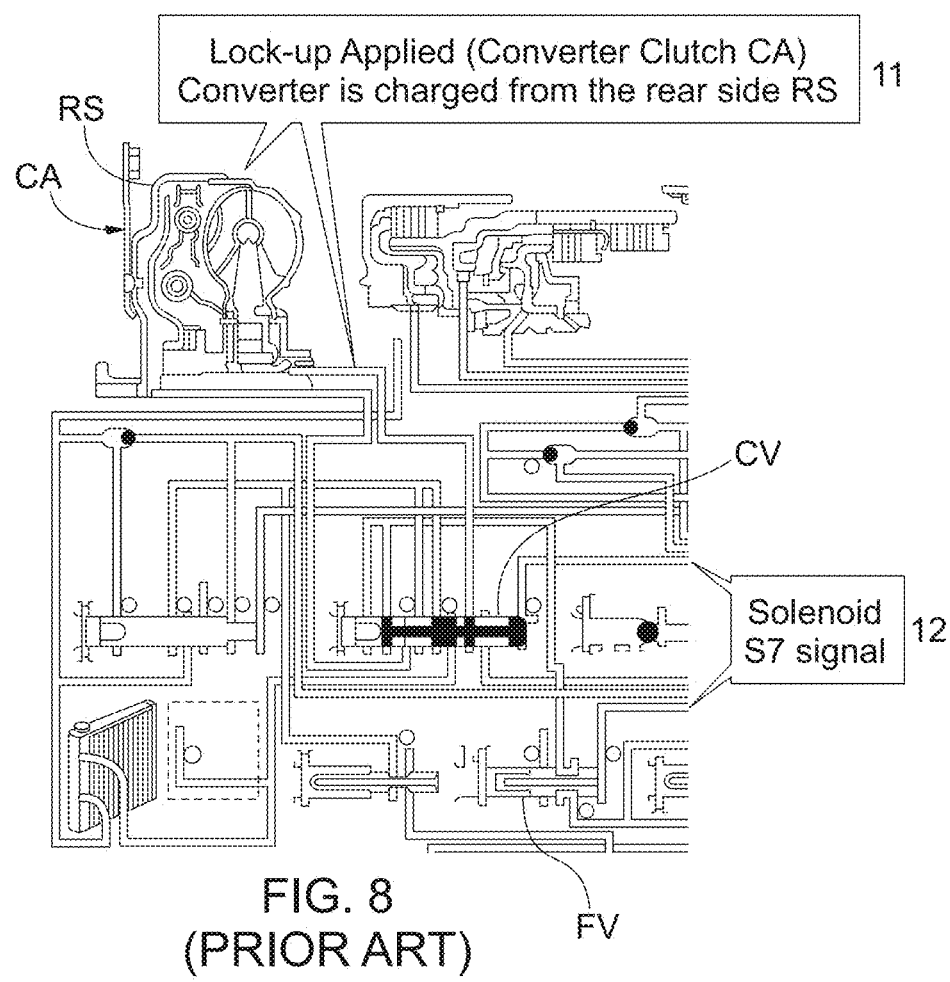
FIG. 8 is a partial view of a hydraulic system diagram of the 8L(xx) series transmission in non-lock-up mode with the torque converter control valve in a rightward position.
Figure 9:
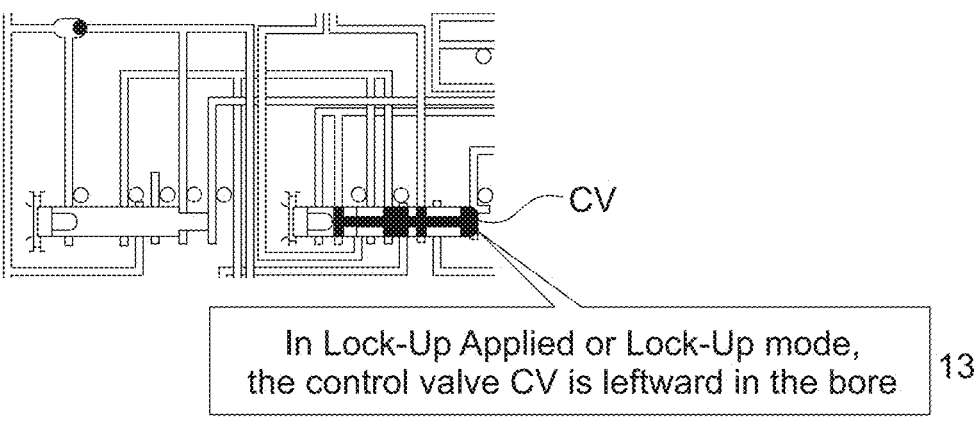
FIG. 9 is a partial view of a hydraulic system diagram of the 8L(xx) series transmission in lock-up mode with the converter control valve in a leftward position.
Figure 15:
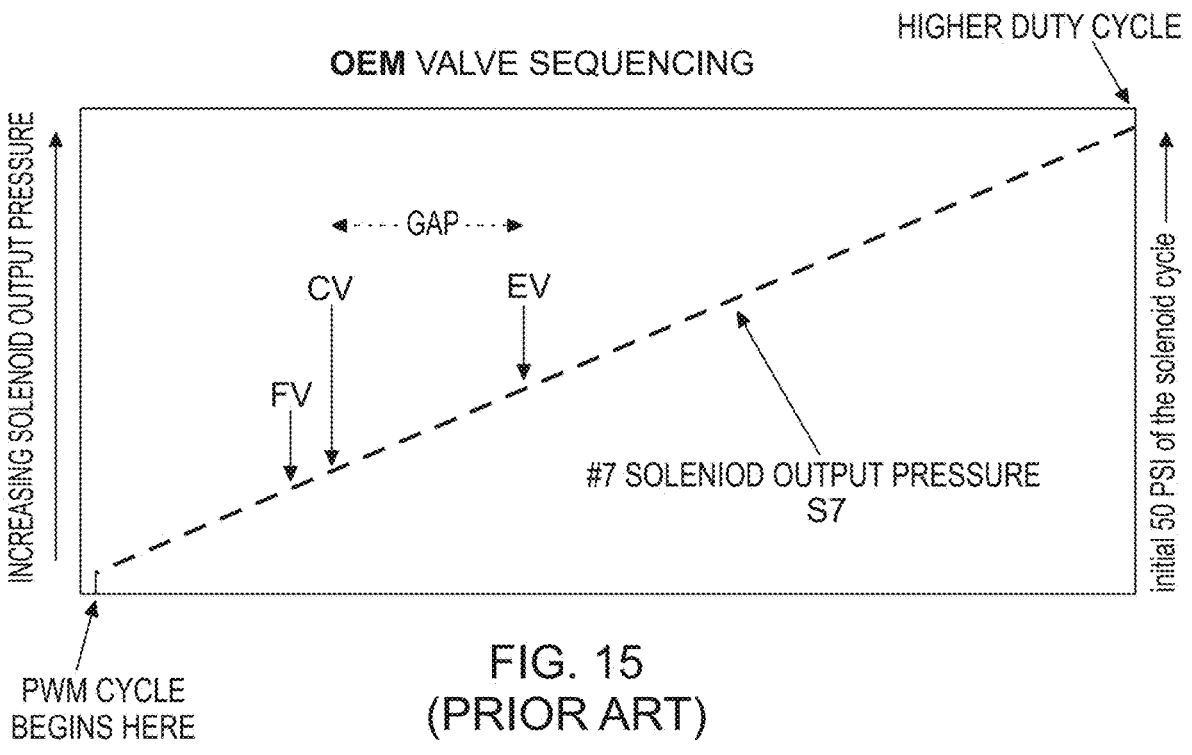
FIG. 15 is an OEM valve sequencing graph of the converter fault valve, torque converter control enable valve, and converter control valve during a Pulse Width Modulation (PWM) cycle in the OEM 8L(xx) series transmission.

Problem B relates to the sequencing of circuit engagement. FIG. 5 shows TC solenoid output and hydraulic solenoid S7 switching strategy applied to three valves, the converter fault valve FV, the converter control valve CV, and the torque converter control enable valve EV. These valves stroke sequentially according to the pattern shown in FIG. 15, with the converter fault valve FV stroking first, then the converter control valve CV stroking second, and then the torque converter control enable valve EV stroking last. The graph in FIG. 15 represents the "front end", or initial 344,738 Pa (50 PSI) of solenoid output as a linear rise. This is the portion of the cycle in which most of the lockup apply should be completed.

It is important to note that the PWM signal and solenoid output are not always linear. For example, solenoid pressure could be sustained at a constant 206843 Pa (30 PSI) to achieve a partial, or controlled slip, lockup, whereas a desired full lockup apply will be more linear.

The valve scheduling of the OEM configuration of the 8L(xx) series transmission is as follows:

1st=converter fault valve FV switches at 82,737.1+ Pa (12+ PSI)

2nd=converter control valve CV switches at 96,526.6+ Pa (14+ PSI)

3rd=TC control enable valve EV switches at 137,895+ Pa (20+ PSI))

Figure 1:
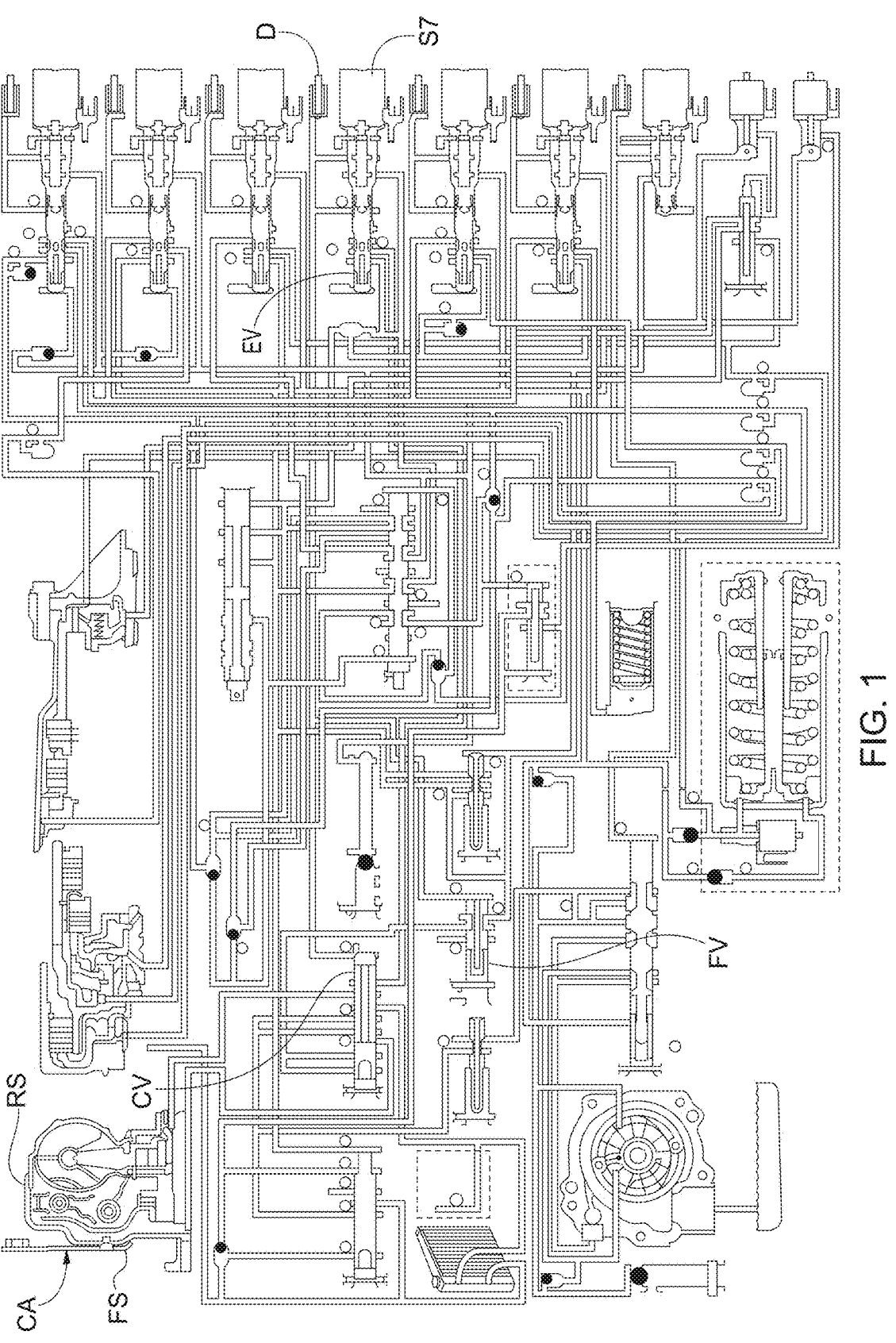
FIG. 1 is a full system hydraulic diagram of the 8L(xx) series transmission with the torque converter clutch (TCC) released.
Figure 2:
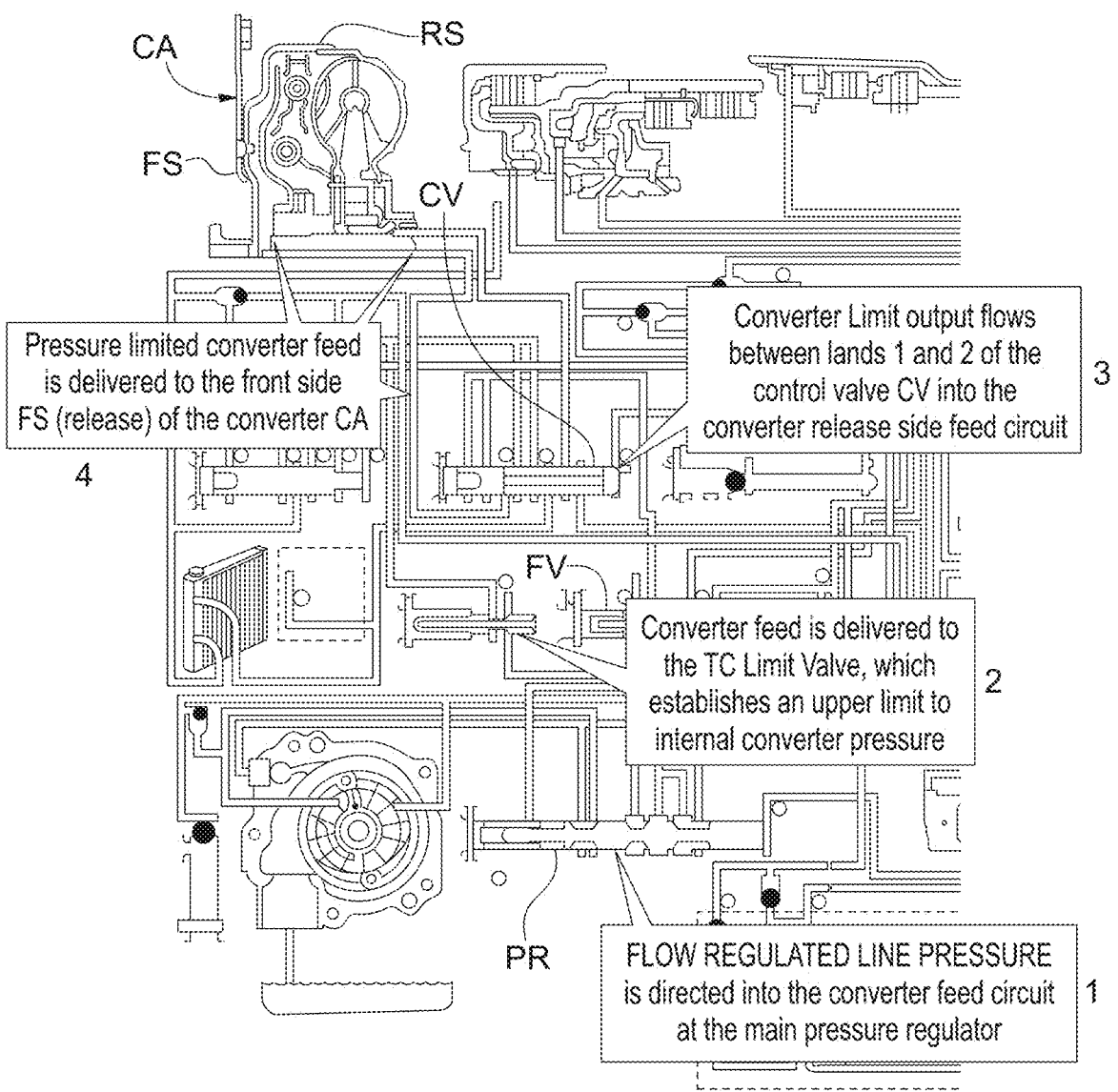
FIG. 2 is a partial view of the hydraulic diagram of FIG. 1 showing the system in partial hydraulic torque converter charge.
Figure 3:
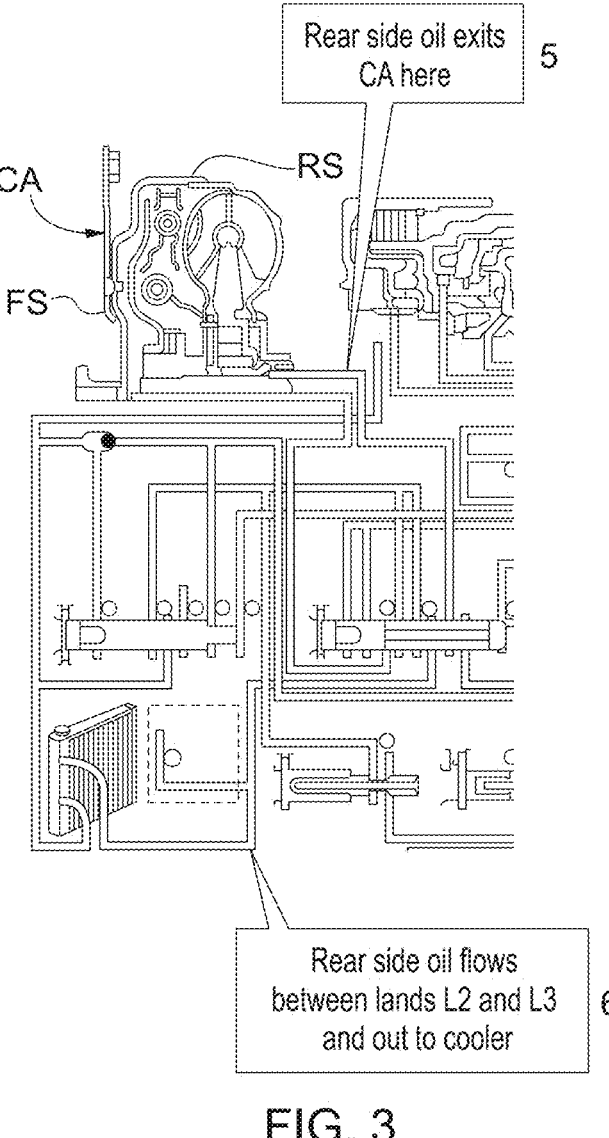
FIG. 3 is a partial view of the hydraulic diagram of FIG. 1 showing the system in partial hydraulic torque converter exhaust.

The OEM process 1000 begins with actuator feed limit (AFL) pressure routed through the fault valve FC to the left end of the control valve CV, as shown in FIG. 1. This prevents accidental lockup apply induced by a "cross-leak" (pressure intrusion from an adjacent circuit) or solenoid malfunction that could cause stroke of the control valve at an unscheduled time. The fault valve strokes and vents AFL at approximately 82,737.1 Pa (12 PSI).

The control valve CV stroke opens enable feed, circuit C in FIG. 11, at about 96,526.6 Pa (14 PSI) and closes cooler, circuit D in FIG. 11, at about 117,211 Pa (17 PSI). During this time the three circuits identified in FIG. 11 are cross-connected, as previously discussed.

The enable valve EV regulation cycle, i.e. ramping of lockup apply pressure, begins at 137,895 Pa (20 PSI). FIG. 15 identifies GAP as a double-sided arrow between stroking of the control valve CV and the enable valve EV to illustrate the extended time delay before the enable valve EV regulation cycle even begins.

Figure 30:
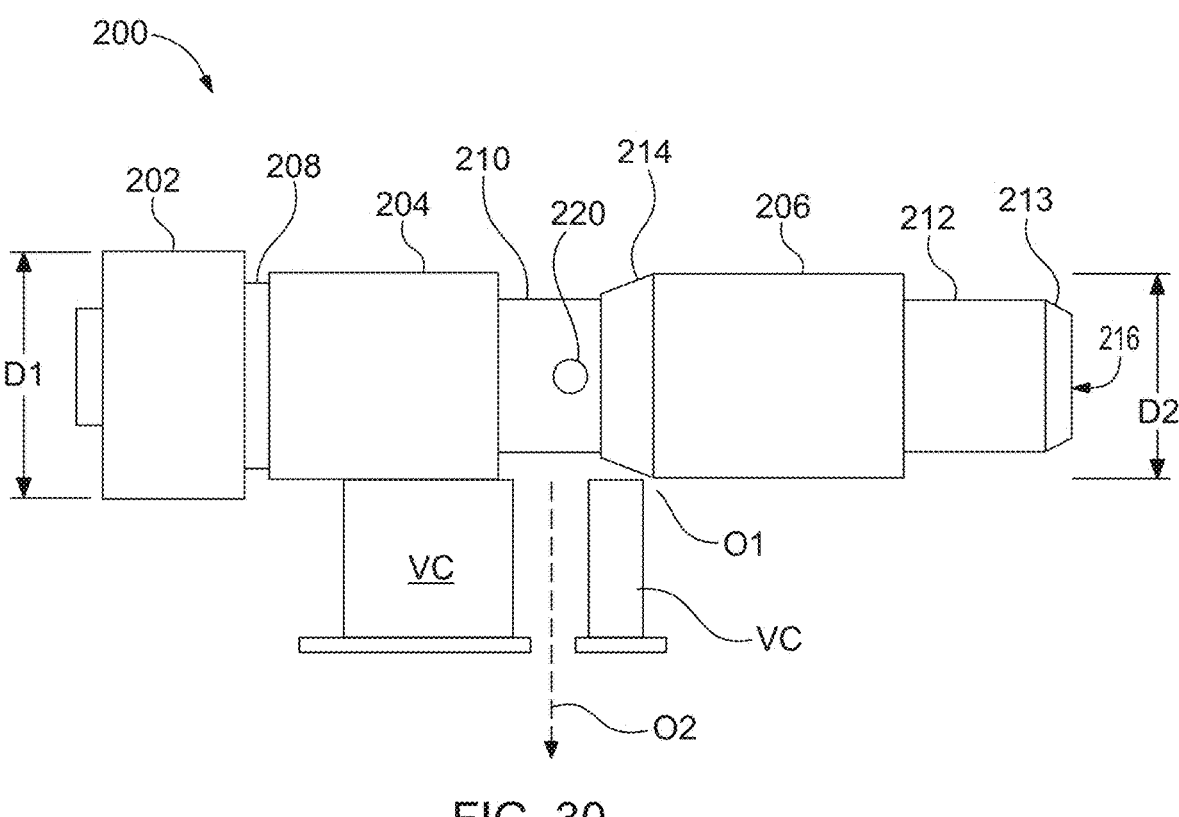
FIG. 30 is a side view of a TCC enable valve of FIG. 25 and visual representation of adjacent transmission valve body castings of the 8L(xx) series transmission.
Figure 31:
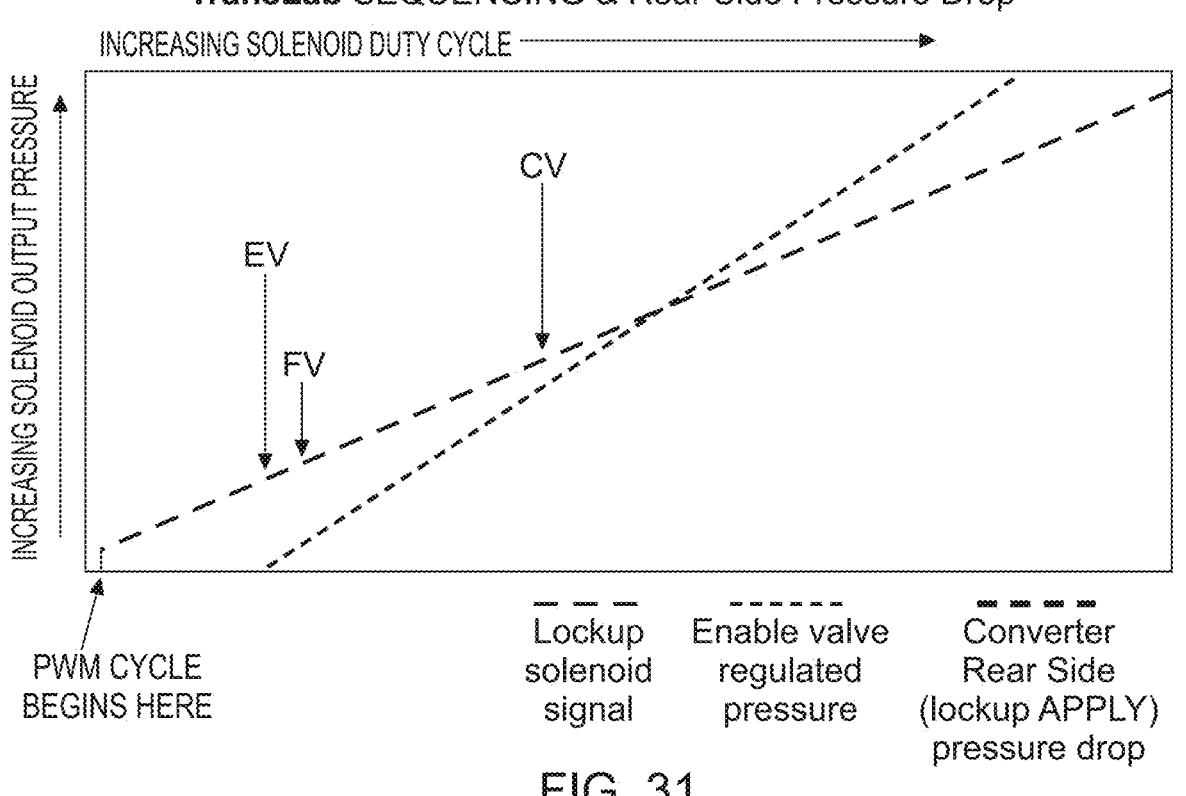
FIG. 31 is a valve sequencing graph showing an alternative embodiment having a different control valve regulation cycle start pressure compared to the start pressure in FIG. 24.

Solenoid S7 signal is applied to the large diameter D1 of the enable valve at the right end in the hydraulic diagram, and enable output is applied to smaller diameter D2 at the left end. FIG. 30 shows the valve 200 horizontally flipped for the machining process to show application of these signals. These areas are in a ratio of 1.44:1, so enable output pressure is equal to 1.44 times the increase in solenoid pressure. Therefore, 68947.6 Pa (10 PSI) increase of solenoid generates 99284.51 Pa (14.4 PSI) increase of TC apply pressure.

Figure 16:
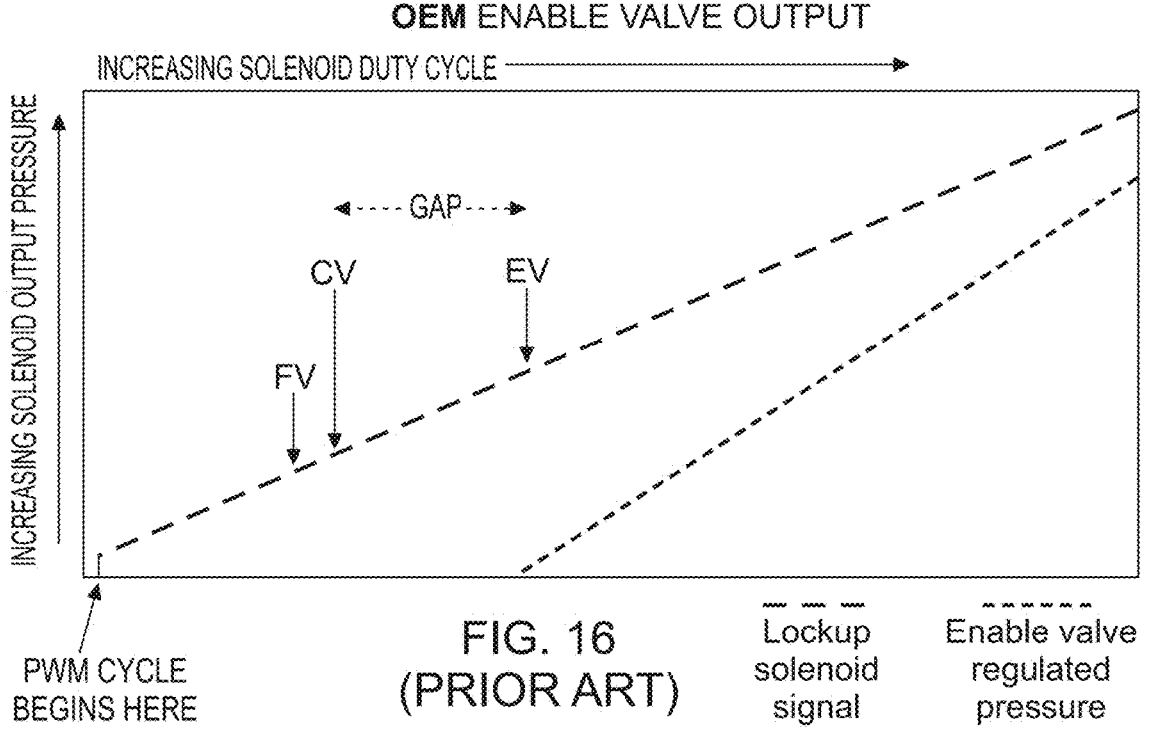
FIG. 16 is the OEM valve sequencing graph of FIG. 15 additionally showing the enable valve regulated pressure through the PWM cycle.

FIG. 16 shows the regulated pressure of the enable valve EV with increasing solenoid S7 pressure previously provided in FIG. 15. Over the 206,843 Pa (30 PSI) increase in the solenoid S7 output pressure from the enable valve EV regulation start point of 137,895 Pa (20 PSI) up to 344738 Pa (50 PSI) represented by the graph, 297853.5 Pa (43.2 PSI) of converter apply pressure is generated.

Figure 17:
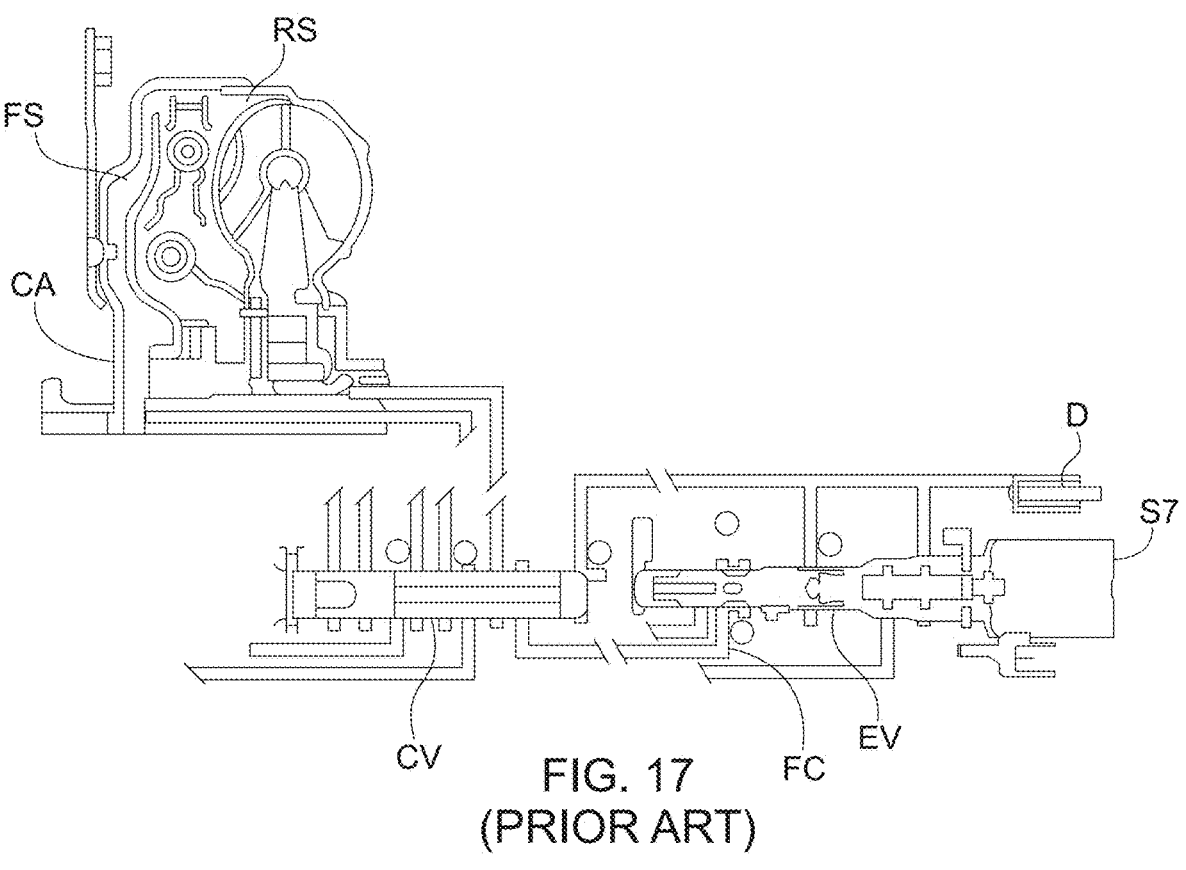
FIG. 17 is a hydraulic diagram of the converter fault valve, torque converter control enable valve, and converter control valve after the enable valve regulation cycle is completed.

FIG. 17 represents the conditions in the control valve CV and enable valve EV after the completion of the process just described. Front side is drained, and the rear side is charged with presumably sufficient enable output pressure to fully apply the clutch. What the figure does not show is what happens during the process, i.e. right before the illustration shown in FIG. 17, and especially during the gap when no Enable output is generated. To show that, FIG. 18 is provided.

Figure 18:
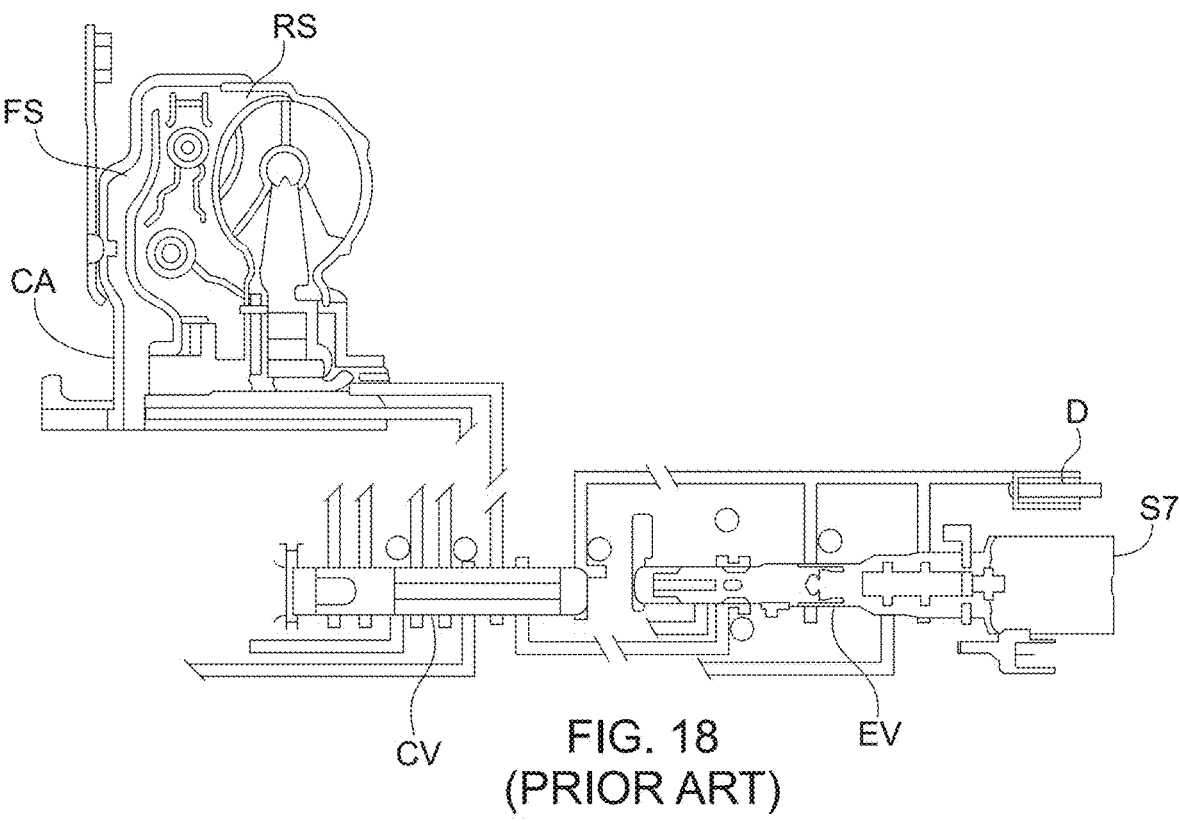
FIG. 18 is a hydraulic diagram of the converter fault valve, torque converter control enable valve, and converter control valve after the Control valve moves, but before the Enable valve regulation cycle begins (between 2 and 3 on FIG. 15)

FIG. 18 is a snapshot of conditions after the control valve CV moves, but before the enable valve EV regulation cycle begins, i.e., between 96526.6 and 137895 Pa (14 and 20 PSI). During this time, no enable output is generated. The enable valve EV is in the rightward position, closed to line supply and open to exhaust. Enable pressure is at zero, and torque converter rear side RS pressure is open to vent at the enable valve exhaust port through the flow control orifice FC under the enable valve EV. The two important considerations are 1) what is the rear side pressure before the control valve moves; and 2) how quickly, or how far does the pressure drop.

Figure 19:
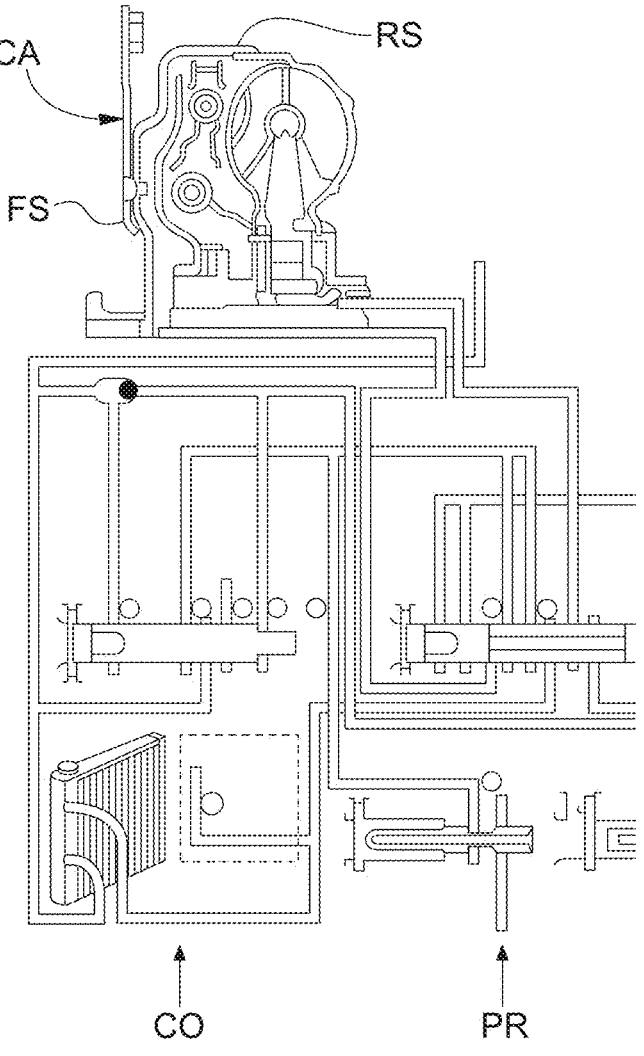
FIG. 19 is a hydraulic diagram of an approximate pressure gradient through the converter and cooler system while in lockup release.

FIG. 19 shows an approximate pressure gradient before the control valve CV moves. These specified line pressures would be typical at slightly elevated idle with a vehicle in park or neutral. The greatest pressure drop is at the torque converter clutch assembly CV between front side FS and rear side RS across the lockup clutch lining. Front side FS pressure is around 413,685-482,633 Pa (60-70 PSI), while rear side RS pressure is at 206,843-241,317 Pa (30-35 PSI). Cooler line pressure is at 137,895 Pa (20 PSI) and line supply from the main pressure regulator PR is around 517,107-551,581 Pa (75-80 PSI). Front side FS pressure is sufficient to hold the clutch released, yet it is in close proximity and is a flow resistor. The centrifugal weight of the rear side RS oil also contributes to the pressure differential, since front side FS pressure is greater than rear pressure plus centrifugal weight/force.

The pressure at the control valve CV is at some intermediate value between rear side RS pressure and cooler CO pressure, as it takes a higher pressure to push flow through the cooler CO at 137,895 Pa (20 PSI).

Multiple factors contribute to rear side RS pressure drop when the control valve CV moves:

1. The cooler CO is an open system, and without additional flow, cooler pressure drops quickly.
2. Until the alternate cooler feed circuit is opened, rear side RS pressure can dissipate through the cooler CO.
3. When front side FS is drained, the damper plate moves against the cover. Without additional Enable pressure/flow, the expanding area causes a rear side pressure RS drop; and last, but most significantly.
4. Even after the left side of land L3 closes on the control valve CV, with the enable valve EV open to exhaust, rear side RS is directly connected to dump, and the pressure of the non-compressible fluid drops almost instantly to zero, as shown in FIG. 20.

Figure 20:
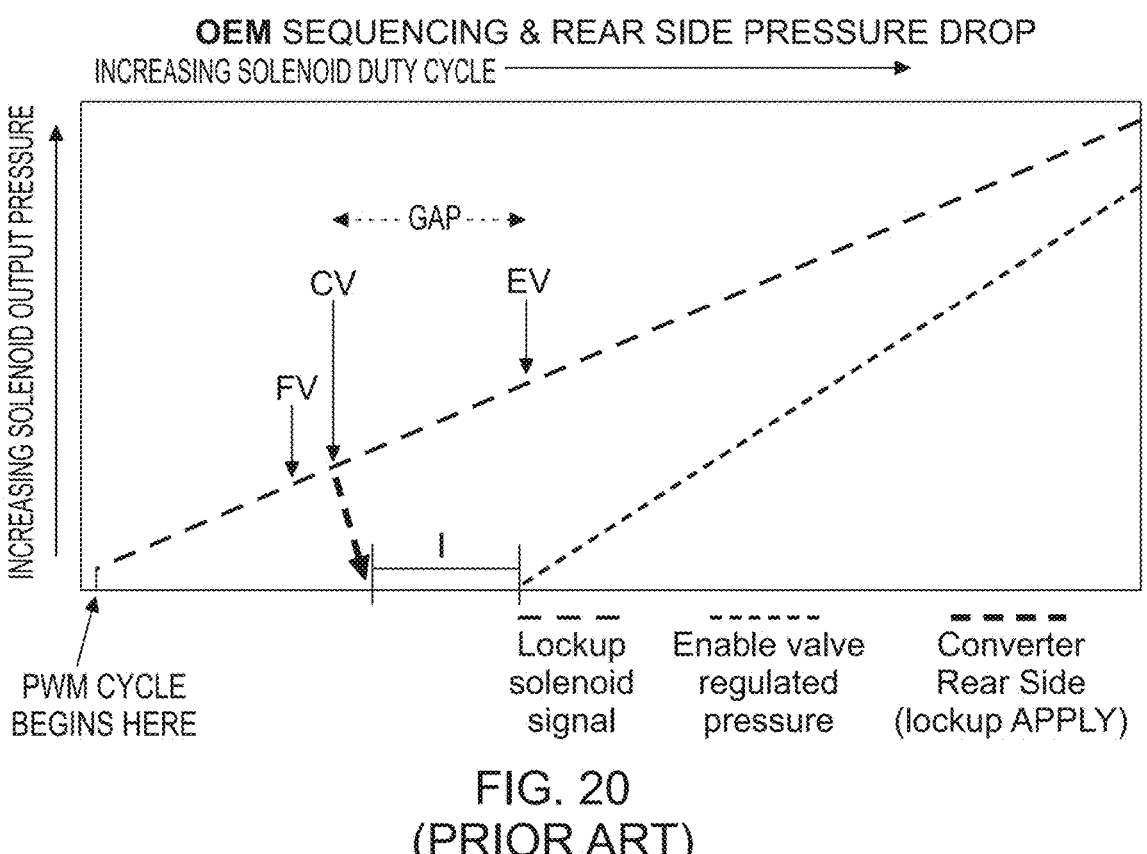
FIG. 20 is an OEM valve sequencing graph of the converter fault valve, torque converter control enable valve, and converter control valve showing converter rear side pressure drop during lockup applied mode.

During the time between the rear side pressure drop and enable valve EV pressure regulation, shown as interval I in FIG. 20, the only lockup apply force is the centrifugal weight of the fluid, but this is only sufficient to drag the clutch on the cover, heating up the friction lining, but inadequate to provide any clamping force to transfer torque of any significant amount. As is clearly illustrated, everything is working against any preservation of rear side RS pressure to assist with lockup apply.

Figure 21:
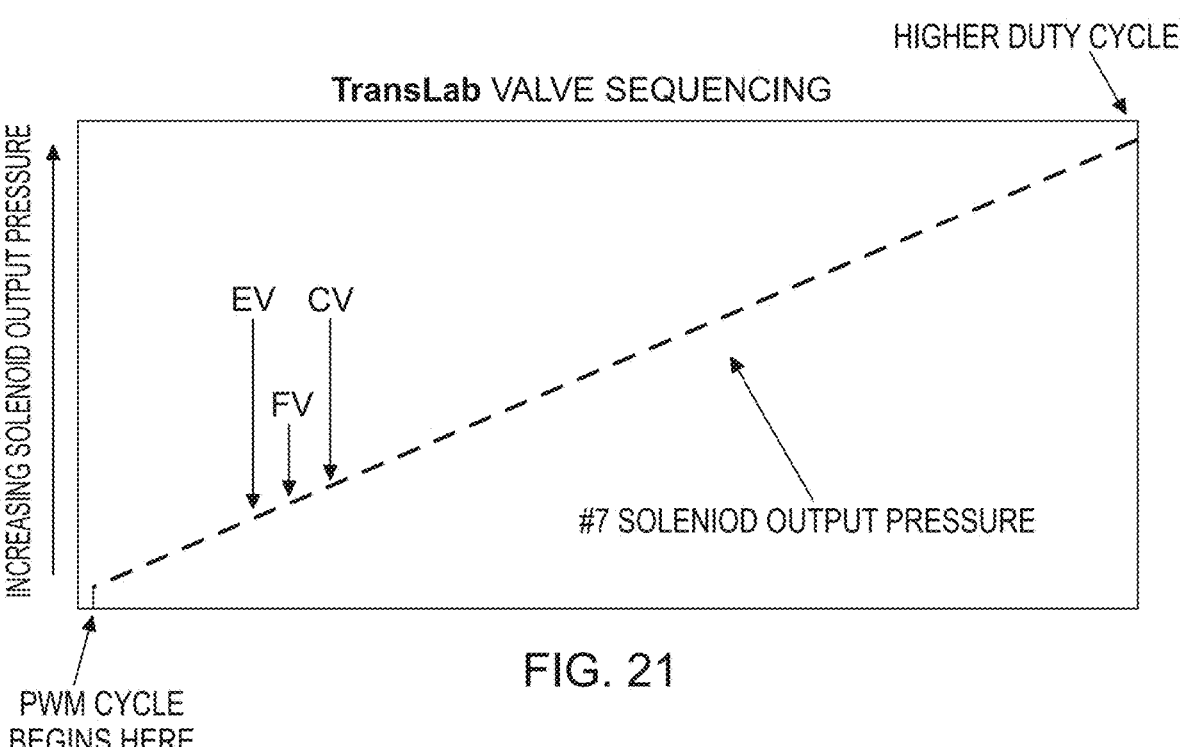
FIG. 21 is valve sequencing graph of converter fault valve, torque converter control enable valve, and converter control valve according to a preferred embodiment of the present invention.
Figure 22:
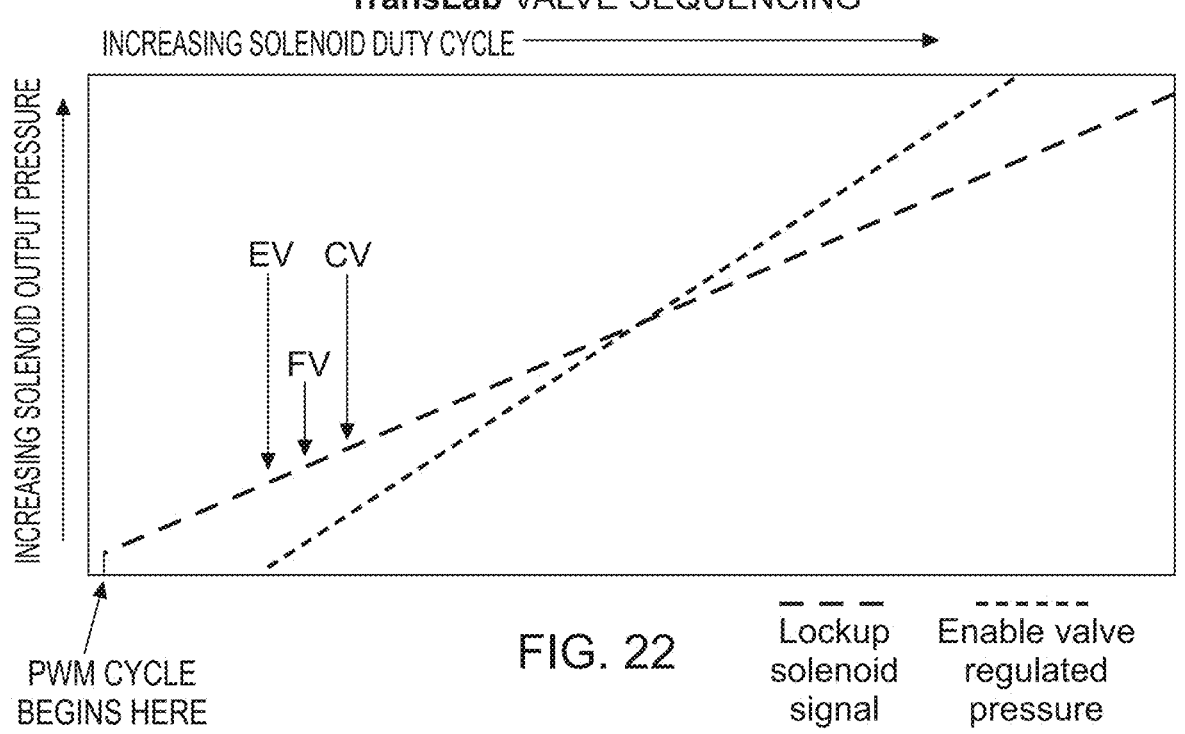
FIG. 22 is a valve sequencing graph showing the enable valve regulated pressure with the valve sequence of the present invention due to resequencing in FIG. 21.

The present invention re-sequences the valve order, as shown in FIG. 21, and as follows:

1st=TC control enable valve CV switches at 68947.6+ Pa (10+ PSI)

2nd=converter fault valve FV switches at 82737.1+ Pa (12+ PSI)

3rd=converter control valve CV switches at 96526.6+ Pa (14+ PSI)

Re-scheduling the enable valve regulation start time 68947.6 Pa (10 PSI) sooner accomplishes several improvements.

First and most importantly, the enable valve exhaust port is closed 27579 Pa (4 PSI) before the control valve CV connects rear side to enable output. With the flow corrected control valve CV of the present invention also installed, see FIGS. 13 and 14, pressure is contained. This prevents the extreme rear side RS pressure drop.

Second, since the regulation cycle has already begun, and is at about 34473.8 Pa (5 PSI) and rising with no time delay when the control valve CV opens, the lockup engagement cycle is dramatically shortened, i.e. the GAP interval shown in FIG. 20, is shortened compared to FIG. 21.

Figure 23:
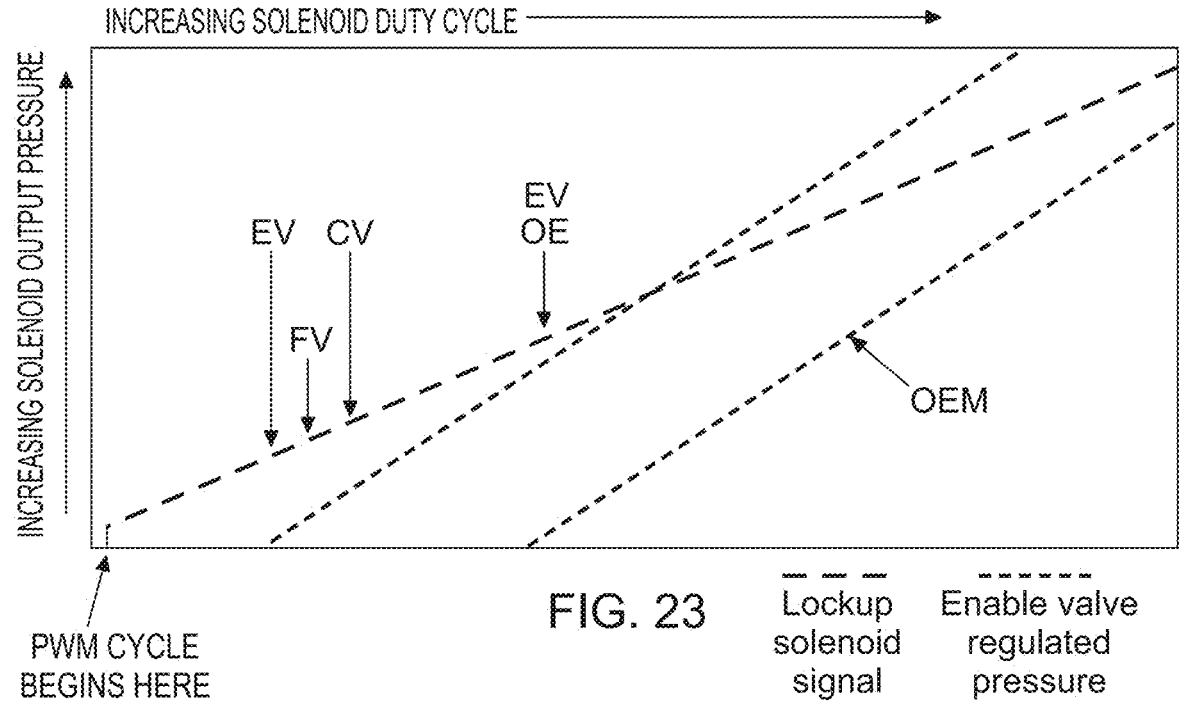
FIG. 23 is a valve sequencing graph comparing the pressure difference in enable valve regulation cycle start between the OEM valve sequence and the valve sequence of the present invention.
Figure 24:
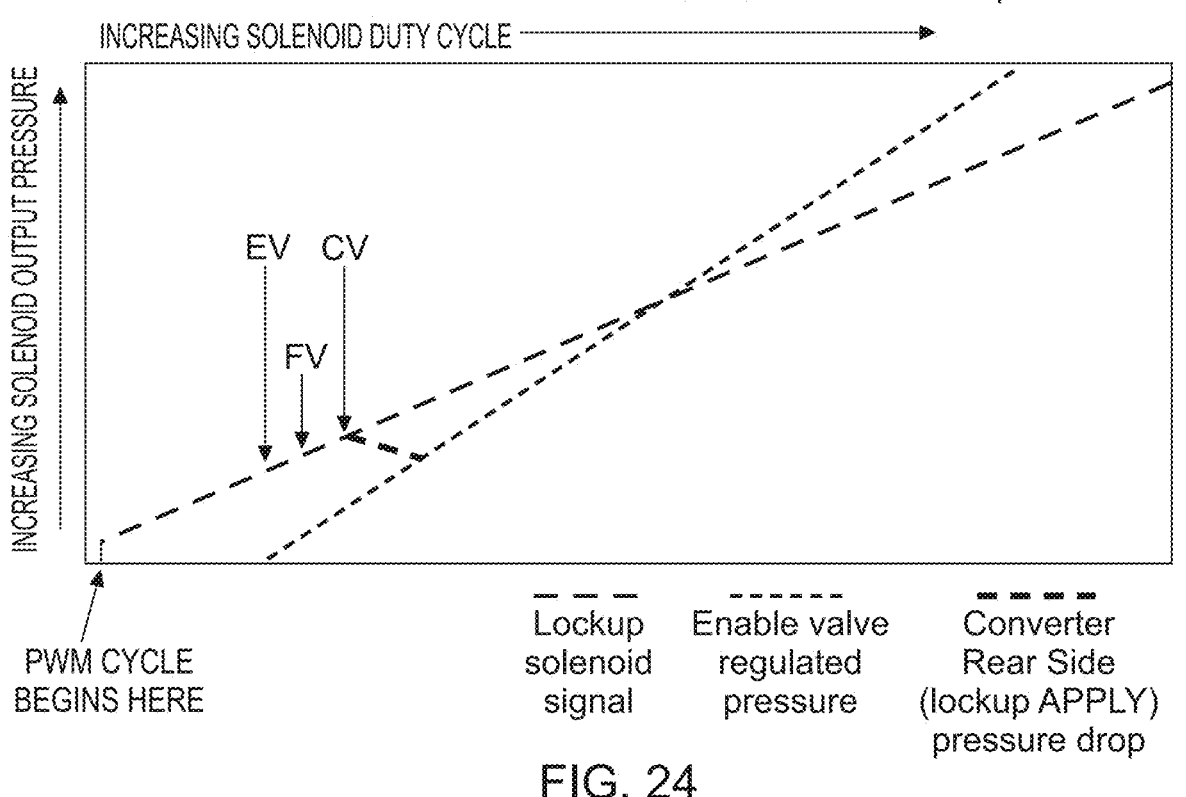
FIG. 24 is a valve sequencing graph of the valve sequence of the present invention showing converter rear side (lock-up Apply) pressure drop.

Third, as shown in FIG. 23, when the present invention regulation cycle and OEM regulation cycle are compared, it is shown that at 137,895 Pa (20 PSI) solenoid S7 signal when OE regulation is just starting from zero, the TL cycle, which started 68947.6 Pa (10 PSI) sooner, is already generating 99284.51 Pa (14.4 PSI) of APPLY pressure, and continues to regulate that additional pressure across the board thereafter. This additional pressure provides the needed extra clamping force required to fix the shudder at cruising speed, even at an incline or pulling a payload.

Figure 25:
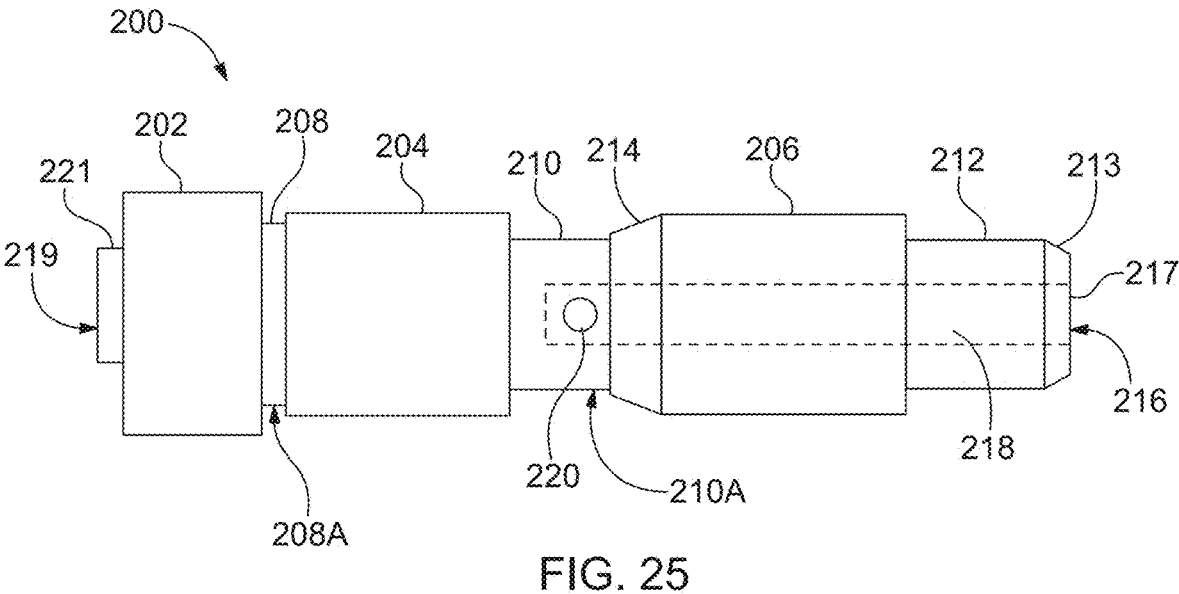
FIG. 25 is a side view of a TCC enable valve according to an embodiment of the present invention.
Figure 26:
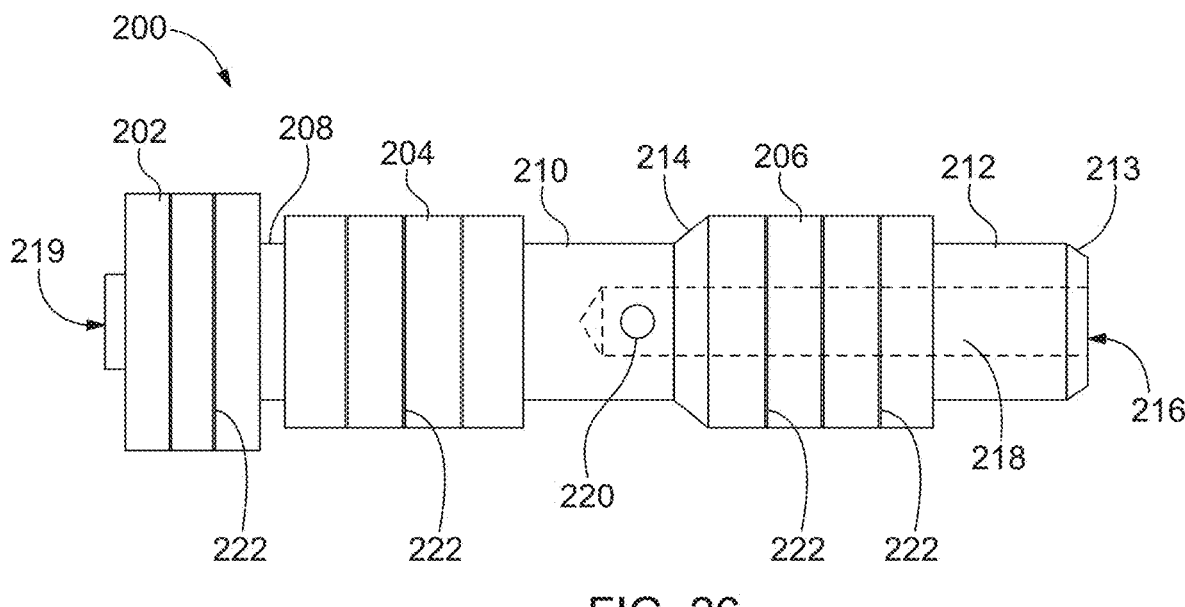
FIG. 26 is a side view of a TCC enable valve according to an alternate embodiment of the present invention.

There is one more dynamic change to the 8L(xx) series transmission. FIG. 25 shows the enable valve 200 of the present invention that replaces the OEM enable valve EV. The vast majority of valves in transmissions are manufactured with "square" lands (as viewed in 2 dimensional drawings). For manufacturing purposes, this is the simplest, fastest, and most economical design.

All square land regulating valves must cycle between open, closed, open, closed, in the bore to regulate, due to the immediate full flow gap as the valve opens. The land must fully close to control the flow. This generates an oscillating output pressure. This high-speed activity also contributes to valve and bore wear. Consequently, since an oscillating valve splits open and closed time, the output is by nature flow limited.

The enable valve 200 is shown again in FIG. 30 to illustrate the importance of the slope 214 of land 206. The slope 214 at the LINE entry point O1, provides a progressive flow rate. In contrast to valves with square lands, the valve 200 does not need to fully close the land, but can regulate flow on a gradient via the increasing area as the sloped land 206 opens along slope 214, and is therefore capable of a much greater flow volume at the same pressure, as regulation does not require closed time. This continual uninterrupted flow can be compared to a sink spigot that can regulate output volume in a non-pulsed manner. The valve does not need to close at any time during regulation, but delivers a continual flow of varied rate according to volume requirement and availability. Orifice O2 allows for Lockup apply flow through the valve casting. The solenoid signal is applied to diameter D1 along land 202. The enable output signal, or lockup apply pressure, is applied to diameter D2.

The torque converter enable valve 200 of the present invention, shown in FIG. 25, includes a first land 202 being cylindrically shaped, a second land 204 being cylindrically shaped, and a third land 206 being cylindrically shaped. A first cylindrical member 208 is coaxially positioned between the first land 202 and the second 204 land and has a smaller diameter than lands 202 and 204 to form a first groove 208A. A second cylindrical member 210 is coaxially positioned between the second land and a slope 214 of the third land 206 to form a second groove 210A. A third cylindrical member 212 extends from an end of the third land 206 opposite to the second cylindrical member 210, a free end 216 of the third cylindrical member having a bevel 213 circumferentially extending therearound. A chamber 218 extends from an opening 217 along the free end 216 of the third cylindrical member 212 and along a longitudinal length inside the torque converter enable valve 200, with a hole 220 positioned along the second cylindrical member 210 fluidly connecting the chamber 218 to external environment. A second bevel or slope 214 is formed circumferentially along an end of the third land 206 adjacent to the second cylindrical member 210. A member 221 may extend from an end 219 of the valve 200 from the first land 202. The member 221, lands 202, 204, and 206, members 208, 210, and 212, chamber 218, opening 217, slope 214, and bevel 213 are all preferably coaxial.

A preferred embodiment of the enable valve 200 has specific dimensions. A total length of the valve 200 is preferably 48.9458 mm (1.927"). The first land preferably has a length of 7.112 mm (0.280") and a diameter of 13.49248 mm+/−0.00508 mm (0.5312"+/−0.0002"). The second land preferably has a length of 11.3284 mm (0.446") and a diameter of 11.24204 mm+/−0.00508 mm (0.4426"+/− 0.0002"). The third land preferably has a total length of 14.478 mm (0.570"), including the slope 214, and a diameter of 11.24204 mm+/−0.00508 mm (0.4426"+/−0.0002"). The slope 214 has a length of 2.54 mm (0.100") and has a diameter that extends from 8.382-11.24204 mm, +/−0.00508 mm (0.330-0.4426"+/−0.0002"). The change in diameter along the length of the slope 214 is preferably linear. The cylindrical member 221 preferably has a length of 1.27 mm (0.050") and a diameter of 6.35 mm (0.250"). The cylindrical member 208 preferably has a length of 1.27 mm (0.050") and a diameter of 10.16 mm (0.400"). The cylindrical member 210 preferably has a length of 5.1562 mm (0.203") and a diameter of 8.382 mm (0.330"). The cylindrical member 212 preferably has a total length of 8.3312 mm (0.328"), including bevel 213, and a diameter of 8.382 mm (0.330"). The bevel 213 has length of 1.27 mm (0.050") and has a diameter that extends from 7.112-8.382 mm (0.280-0.330"). The change in diameter along the length of the bevel 213 is preferably linear. The chamber 218 has a length of 26.67 mm (1.05") and diameter of 3.175 mm (0.125"). The hole 220 preferably has a diameter of 1.7018 mm (0.067").

In an alternate embodiment of the enable valve 200, an upper surface of the first land 202, the second land 204, and the third land 206, minus the slope 214, is grooved with a plurality of circumferential grooves 222. The enable valve 200 is used to replace the OEM enable valve, which increases a volume of continual non-oscillating pressure output without use of a counter-balance spring, and inherently dampens as a counter-measure to an effect of applied oscillating signal.

FIG. 30 illustrates the principle of using non-squared lands to regulate pressure. Flow through an orifice is a function of viscosity, area, and applied pressure. The slope 214 design on land 206 of the enable valve 200 greatly increases flow through the valve, proving that the flow limiter in the transmission circuit is actually the valve, not the orifice. In like fashion, the valve 200 design when applied to the 8L transmission, is capable of much faster fill rate, thereby shortening the converter rear side apply cycle by an estimated 30-40%. With the leak out of the lockup apply circuit closed at the control valve CV via replacement of that valve with valve 100, the enable valve 200 regulation cycle begins earlier, and the flow delivery is increased to fix the shudder problem.

Oscillating circuits is explained at length so the following can also be understood clearly. The slope 214 on land 206 on the enable valve 200 of the present invention has been shown to stabilize the valve output by permitting a more laminar and continuous non-oscillating flow. This also has a secondary advantage of dampening an oscillating signal applied to the valve 200 itself. In this specific case, it tends to override the oscillating solenoid signal applied to the enable valve EV, minimizing oscillation transfer to the valve's own output pressure.

The volume displacement, or wave compression, in the oscillating circuit is so small, in relation to the flow volume regulated by the valve 200, that in a functional sense, as far as the valve is concerned, the oscillation vanishes. Since it is not a square land valve, it is far more difficult to transfer the oscillation applied to the valve to its output signal. The output flow itself dampens the valve 200. In the same way a child in an innertube bounces on the water when jumping in, the enable valve 200 bounces into the pressure/flow it regulates.

FIGS. 21-25 use the abbreviations EV, CV, and FV for the enable valve, control valve, and fault valve, respectively. In the preferred invention, the OEM enable valve EV is replaced with enable valve 200 and OEM control valve CV is replaced with control valve 100. The fault valve remains the OEM fault valve. The abbreviations EV, CV, and FV in FIGS. 21-25 and 31 are only meant to represent the switching of the valve scheduling and provide easy reference in comparison to the OEM scheduling of valve switching, with the enable valve 200 switching before the control valve 100 and preferably before the fault valve FV and the control valve 100.

Concerning Problem C, the lockup solenoid S7 malfunction, two key factors are problematic:

1) Solenoid internal valve oscillation is an intrinsic function of the pressure regulation cycle.

2) Particulates in the fluid media are a product of normal wear and are unavoidable (the most common cause of valve sticking).

If and when the enable valve EV gets stuck in the open position it will allow LINE intrusion into the solenoid signal circuit. This will pin the enable valve EV in the fully open position (bottomed in the bore), feeding full LINE pressure into the torque converter. Excess internal converter pressure "balloons" (longitudinally expands) the tank, lengthening internal clearance and axial support is lost. The lockup clutch plate moves too far from the front cover and the stator and turbine can rock and collide. This "interference damage" is common when a converter bearing fails. The same dynamic occurs with ballooning.

Solenoid malfunctions are commonplace in the transmission industry. The best preventive medicine is to keep the fluid clean, but beyond that, solenoid malfunctions are unpredictable and unpreventable. What can be done however, is to incorporate an emergency pressure relief system to prevent catastrophic consequences.

Figure 4:
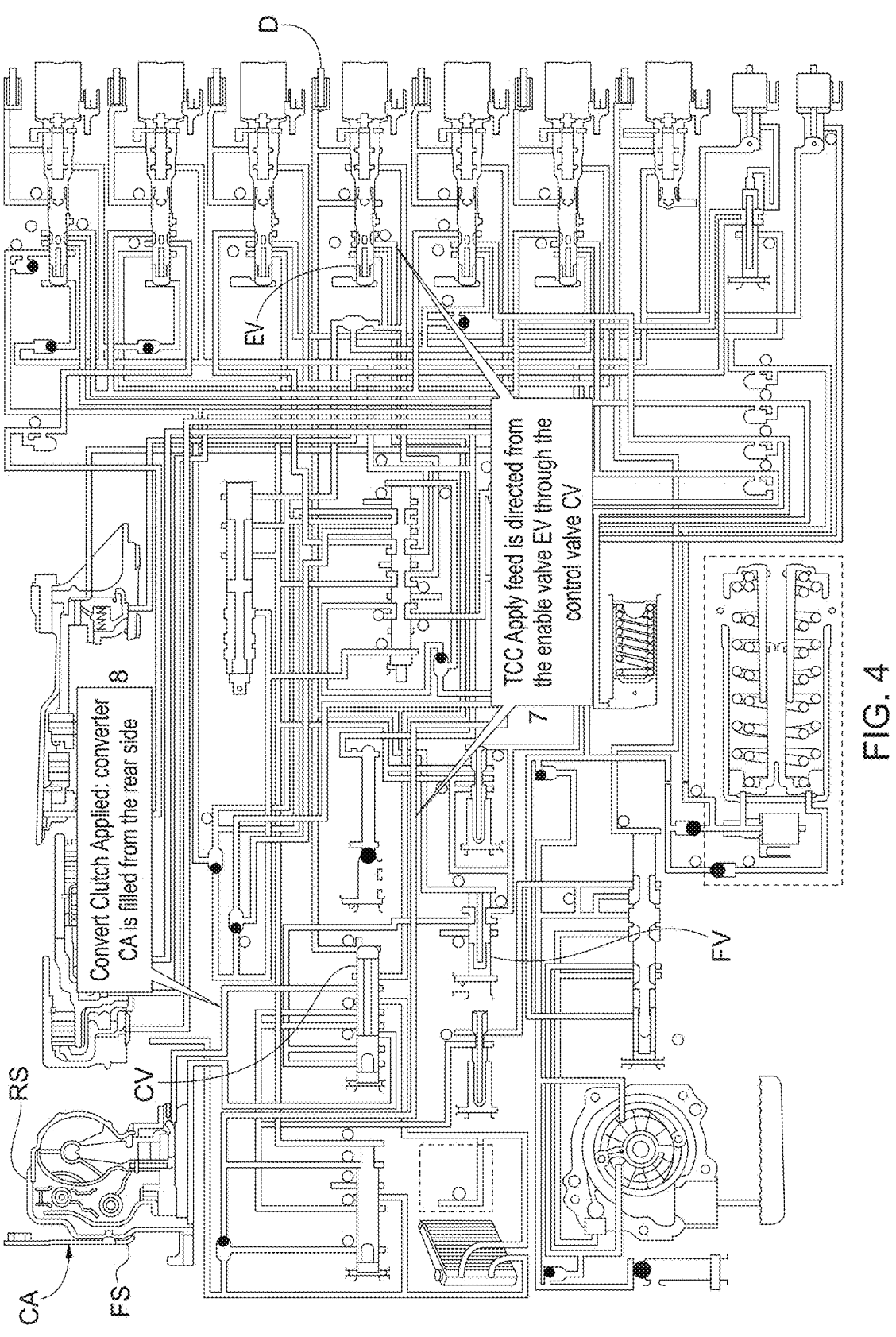
FIG. 4 is a full system hydraulic diagram of the 8L(xx) series transmission with the torque converter clutch applied.

FIG. 4 shows the full hydraulic schematic with lockup applied. FIG. 5 is a cropped partial view of FIG. 4 and shows the full lockup control circuit. Solenoid output (or signal) is blue in the colored hydraulic. Note there is no high-pressure safety relief built into the circuit. There is a pressure oscillation damper D in the circuit, shown in FIGS. 17 and 18, and this damper D can be converted into a pressure relief system. That is to say, the damper D can be replaced by another device utilizing the same bore and vent circuit.

Figure 27:
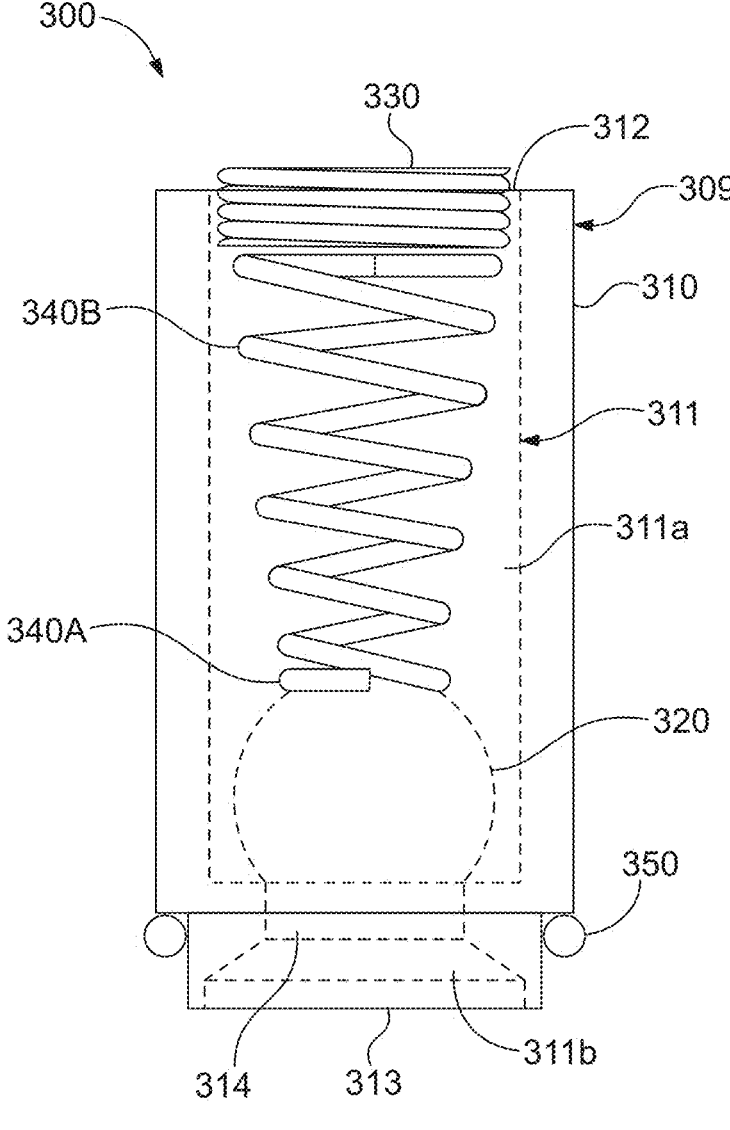
FIG. 27 is a side view of an anti-ballooning damper assembly according to an embodiment of the present invention, with dotted lines showing internal structures.
Figure 28:
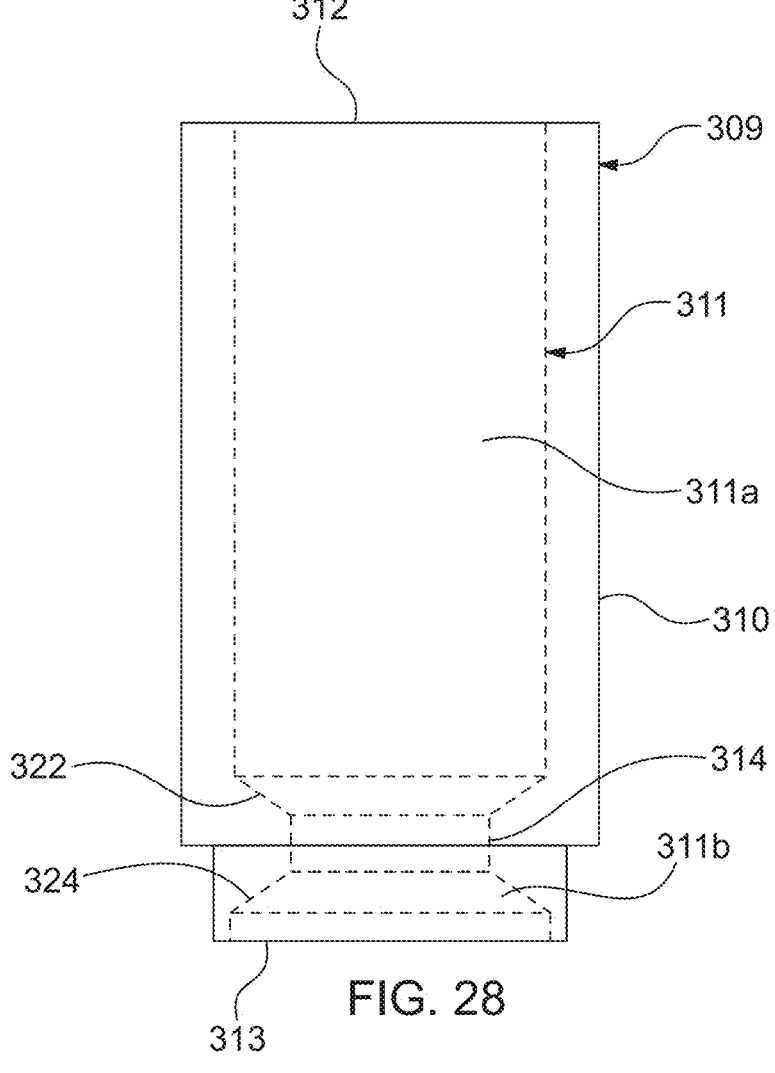
FIG. 28 is a side view of a valve body of the anti-ballooning damper assembly of FIG. 27.
Figure 29:
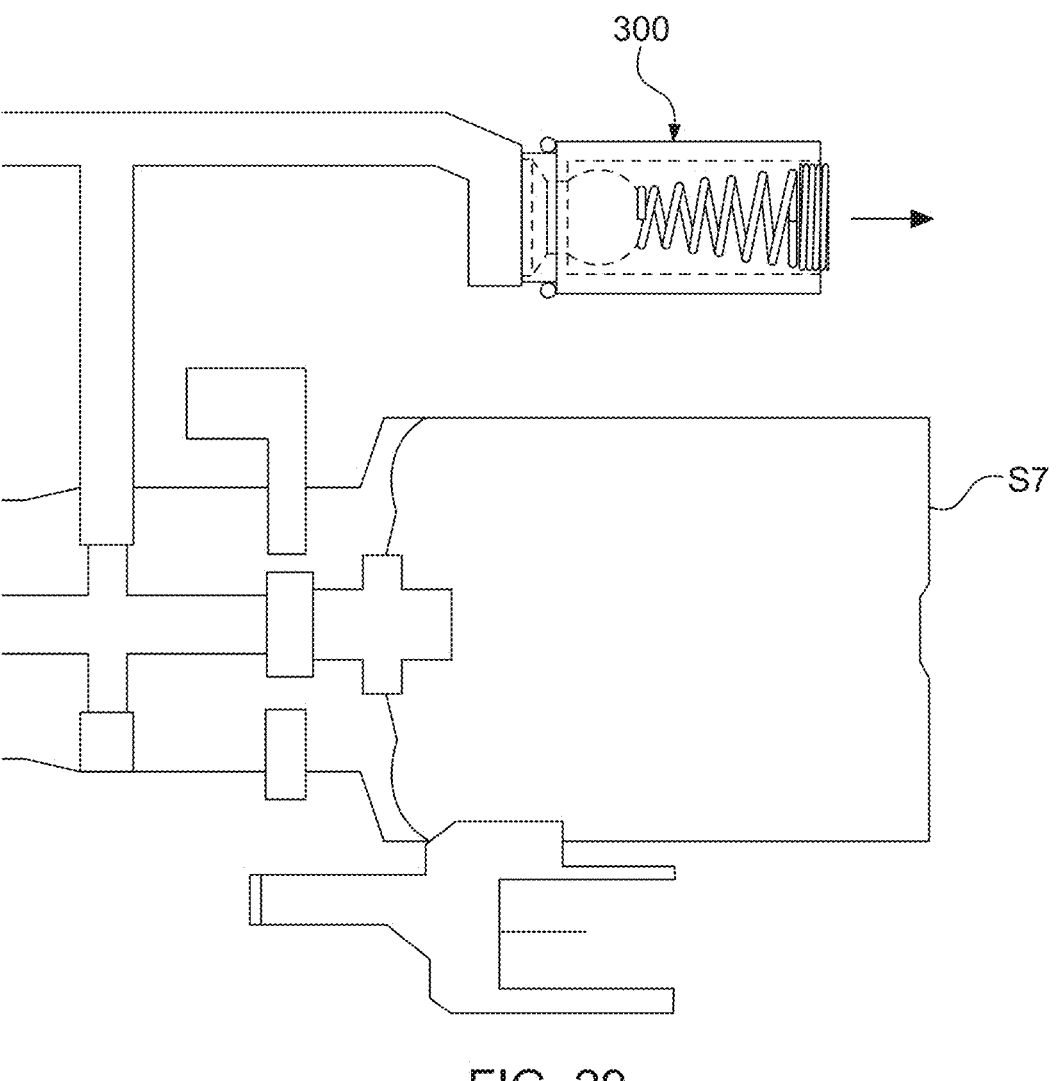
FIG. 29 is a hydraulic diagram showing the anti-ballooning damper assembly replacing the OEM oscillation damper in the 8L(xx) series transmission.

To address these issues, an anti-ballooning damper assembly 300 is provided in FIG. 27. The anti-ballooning damper assembly 300 includes a cylindrical sleeve 309 having a cylindrical body 310 with a chamber 311 extending through an interior of the cylindrical body, ends of the chamber defined by two opposing openings 312 and 313. Each opening 312 and 313 is located at an opposing longitudinal end of the cylindrical body 310. The chamber 311 has a choke area 314 that has a smaller diameter than a remainder of the chamber on either side of the choke area. A valve member 320 is sized to partially fit within the choke area 314, specifically within an upper chamber 311A, to fluidly seal the upper chamber 311A from the lower chamber 311B via the choke 314. The valve member may be spherical, as shown in FIG. 27, or be conical, have a conical portion, or be any other shape that would provide a fluid seal at choke 314, which is configured to be the smallest diameter within the chamber 311. A sloped circumference 322 of the upper chamber 311A allows a metered transition in diameter between the upper chamber to the choke area 314. A lower chamber 311B of the chamber 311 on the other side of the choke area 314 opposite to the upper chamber 311A also has a sloped circumference 324 to again allow for a metered transition in diameter between the lower chamber to the choke area. A conical spring 340 with a first end 340A and a second end 340B, the first end having a smaller diameter than the second end. A circular spring seat 330 is provided to fit at least partially within the upper chamber 311A. The spring set 330 is configured to allow liquid to pass through it along opening 312 and into chamber 311 and vice versa. The valve member 320 is configured to sit within the choke area 314 and the conical spring 340 is configured to be positioned between the ball and circular spring seat 330 when the anti-ballooning damper assembly 300 is assembled. The cylindrical body 310 has a narrowed portion 326 through which a portion of the choke 314 and the lower chamber 311B extend. The narrowed portion 326 also has opening 313 being a free end of the sleeve 309. A seal, being an elastomeric ring, in this case an O-ring 350, is securable around a circumference of the narrowed portion 326 and preferable against the cylindrical body 310.

A preferred embodiment of the anti-ballooning damper assembly 300 has specific dimensions. The sleeve 309 preferably has a total length of 19.558 mm (0.770"). The cylindrical body 310 preferably has a length of 17.018 mm (0.670") and a diameter of 9.9822 mm+/−0.00508 mm (0.393"+/−0.0002"). The narrowed portion has a length of 2.54 mm (0.100") and a diameter of 8.4328 mm+/−0.0254 mm (0.332"+/−0.001"). The chamber 311 has a diameter of 7.366 mm (0.290") and a length, from opening 312 to the choke 314, of 16.51 mm (0.650"). The choke 314 has a diameter of 3.9624 mm (0.156"). The opening 313 has a diameter of 6.75132 mm (0.2658"). The valve member 320 shown in FIG. 27 preferably has a diameter of 5.95376 mm (0.2344").

To install the anti-ballooning damper assembly 300, an OEM spring-loaded piston of the OEM pressure oscillation dampener D is removed. The anti-ballooning damper assembly 300 is then inserted into the same orifice from where the OEM spring-loaded piston was removed. The sleeve 309 of the anti-ballooning damper assembly 300 is inserted opening 313 first. The valve member 320, spring 340, and spring seat 330 may be installed in the sleeve 309 before insertion of the sleeve or afterwards. If afterwards, the valve member 326 is inserted first, then the spring 340 with narrower end 340A installed first to contact the valve member 320. The spring seat 330 is then installed in contact with wider end 340B of the spring 340. The spring 340 is configured to compress and expand in response to increasing or decreasing, respectively, pressure applied to valve member 320 via fluid flow through choke 314. The spring seat 330 may be separate from the spring 340 or may be formed into a single or connected piece with the spring.

The process for conserving and improving automotive transmission converter rear side pressure during a switching event in a transmission, preferably a 8L(xx) series transmission, performance includes multiple processes each of which are also individually considered inventions. A first process involves sealing a leak along a converter control valve CV close to a cooler port orifice Pd (TO COOLER port), which fluidly connects circuit B with circuit D, simultaneously or slightly before opening a torque converter enable supply port orifice Pc, which fluidly connects circuit B with circuit C, at the control valve CV. Removal of the OEM torque converter control valve CV and replacing it with the control valve 100 corrects the leak and issue with crossing the three lines or circuits B, C, and D. The orifices Pc and Pd are the openings in the valve casting body VC fluidly connecting the circuits, or lines, with each other, specifically circuits B, C, and D and which the land L3 in the OEM control valve CV moves to and/or through. Land 106 of control valve 100 corrects the leak issue by closing a cooler port, via the orifice Pd, in a valve body casting VC simultaneously or slightly before opening a torque converter enable supply port, via the orifice Pc, in the valve body casting at the torque converter control valve 100.

Next, the torque converter enable valve EV regulation start time is rescheduled to begin before a switching time of the converter control valve CV, wherein the enable valve EV exhaust port is closed to prevent rear side venting of volume. Preferably, the enable valve EV exhaust port is closed 27579 Pa (4 PSI) before the control valve CV connects rear side to enable output. A lockup apply cycle is also shortened through insertion of the enable valve 200, which provides for greater flow volume delivery at a same pressure as an OEM enable valve EV, to fill and pressurize the torque converter rear side RS for faster lockup apply. Replacement of the OEM enable valve EV with the enable valve 200 shortens the lock-up apply cycle.

Additionally, during a solenoid signal, the torque converter enable valve 200 may begin a torque converter enable regulation cycle before switching of either the converter control valve 100 or a converter fault valve FV. The torque converter enable valve may begin to regulate at 68947.6 Pa, the converter fault valve then begins to switch at 82,737.1 Pa, and the converter control valve then begins to switch at 96,526.6 Pa.

Alternatively, the torque converter enable valve 200 may begin to switch at 137,895 Pa, and the converter fault valve FV and the converter control valve 100 then begin to switch after 137,895 Pa.

Alternatively, or in addition, the torque converter enable valve 200 may begin to switch 20684.3 Pa or less before the pressure necessary to begin to switch the converter control valve 100.

Alternatively, instead of rescheduling the torque converter enable valve start time, a start time of a converter fault valve FVC and the converter control valve 100 may be rescheduled to start after the torque converter enable valve 200 start time.

Additionally, the solenoid signal may have a control valve switching time pressure of 110,316 to 186,158 Pa.

Additionally, replacing the damper at solenoid S7 with the anti-ballooning assembly 300 provides emergency pressure blow-off and prevents run-away internal converter pressure.

I claim:

1. A process for conserving and improving automotive transmission converter rear side pressure during a switching event, comprising:
    a. sealing a leak along a torque converter control valve close to a cooler port simultaneously or slightly before opening a torque converter enable supply port at the torque converter control valve by replacing an OEM torque converter control valve with the torque converter control valve, whereby the leak is sealed via an increased length of a third land of the torque converter control valve, compared to the OEM torque converter control valve;
    b. replacing an OEM torque converter enable valve with the torque converter enable valve, which increases a volume of continual non-oscillating pressure output without use of a counter-balance spring, and inherently dampens as a countermeasure to an effect of applied oscillating signal; and
    rescheduling a torque converter enable valve regulation start time to begin before a switching time of the torque converter control valve, wherein an enable valve exhaust port is closed to prevent rear side venting of volume, or a start time of a torque converter fault valve and the torque converter control valve can be rescheduled to start after the torque converter enable valve start time; and
    c. shortening a lockup apply cycle through with a torque converter enable valve having at least one non-squared land, which provides for greater flow volume delivery at a same pressure as an OEM enable valve, to fill and pressurize a torque converter rear side for faster lockup apply.

2. The process of claim 1, further comprising the step of:
    d. removing an OEM damper from a damper bore and replacing the OEM damper with an anti-ballooning pressure relief valve assembly to provide emergency pressure blow-off and prevent run-away internal converter pressure.

3. The process of claim 2, wherein the anti-ballooning pressure relief valve assembly comprises:
    a cylindrical sleeve having two opposing longitudinal ends, with an opening at each of the two opposing longitudinal ends;
    an inner chamber longitudinally extending within the cylindrical sleeve between, and fluidly connected to, the opening at each of the two opposing longitudinal ends;
    a choke area in the inner chamber with a smaller diameter compared to inner chamber;
    a spring seat configured to be positioned within the opening of one longitudinal end of the two opposing longitudinal ends;
    a valve member configured to be positioned within the inner chamber and removable seal the inner chamber along the choke area; and
    a spring positionable between the spring seat and valve member.

4. The process of claim 1, wherein, during a solenoid signal, the torque converter enable valve begins a torque converter enable regulation cycle before switching of either the torque converter control valve or a torque converter fault valve.

5. The process of claim 4, wherein the torque converter enable valve begins to regulate at 68947.6 pascal (Pa), the torque converter fault valve begins to switch at 82,737.1 Pa, and the torque converter control valve begins to switch at 96,526.6 Pa.

6. The process of claim 4, wherein the torque converter enable valve begins to switch at 137,895 pascal (Pa), and the torque converter fault valve and the torque converter control valve begin to switch after 137,895 Pa.

7. The process of claim 4, wherein the torque converter enable valve begins to switch 20684.3 pascal (Pa) or less before the pressure necessary to begin to switch the torque converter control valve.

8. The process of claim 1, wherein the solenoid signal has a control valve switching time pressure of 110,316 to 186,158 pascal (Pa).

9. The process of claim 1, wherein the torque converter control valve comprises:
    a first land being cylindrically shaped;
    a second land being cylindrically shaped;
    a third land being cylindrically shaped;
    a fourth land being cylindrically shaped;
    a first cylindrical member coaxially positioned between the first land and the second land to form a first groove;
    a second cylindrical member coaxially positioned between the second land and the third land to form a second groove; and a third cylindrical member coaxially positioned between the third land and the fourth land to form a third groove, wherein a bevel circumferentially extends around an end of the first land adjacent to the first cylindrical member, and a length of the third land is greater than 4.8768 mm and is configured to close the cooler port in a valve body casting simultaneously or slightly before opening the torque converter enable supply port in the valve body casting at the torque converter control valve.

10. The process of claim 9, wherein the third land comprises two or more smaller lands, each smaller land of the two or more smaller lands being separated from adjacent smaller lands of the two or more smaller lands by a cylindrical member forming a groove therebetween.

11. The process of claim 9, wherein the length of the third land is equal to or greater than 5.207 mm.

12. The process of claim 9, wherein the length of the third land is about 6.1468 mm.

13. The process of claim 1, wherein the torque converter enable valve comprises:

a first land being cylindrically shaped;

a second land being cylindrically shaped;

a third land being cylindrically shaped;

a first cylindrical member coaxially positioned between the first land and the second land to form a first groove;

a second cylindrical member coaxially positioned between the second land and the third land to form a second groove;

a third cylindrical member extending from an end of the third land opposite to the second cylindrical member, a free end of the third cylindrical member having a bevel circumferentially extending therearound;

a chamber extending from an opening along the free end of the third cylindrical member and along a longitudinal length inside the torque converter enable valve, with a hole positioned along the second cylindrical member fluidly connecting the chamber to external environment, wherein a second bevel is formed circumferentially along an end of the third land adjacent to the second cylindrical member.

14. The process of claim 13, wherein the first land, the second land, and the third land are grooved.

15. The process of claim 1, wherein the length of the third land of the torque converter control valve is greater than 4.8768 mm.

* * * * *